US008198759B2

(12) United States Patent
Hurst et al.

(10) Patent No.: US 8,198,759 B2
(45) Date of Patent: Jun. 12, 2012

(54) PORTABLE POWER PACKS HAVING A UNIFORM DC ENVIRONMENT

(75) Inventors: Aeron Hurst, Martindale, TX (US); Carlos Coe, San Marcos, TX (US); Charles Moyer, Manchaca, TX (US); Grant Randall, Austin, TX (US); Lupe Carranco, San Marcos, TX (US)

(73) Assignee: Xtreme Power Inc., Kyle, TX (US)

( * ) Notice: Subject to any disclaimer, the term of this patent is extended or adjusted under 35 U.S.C. 154(b) by 411 days.

(21) Appl. No.: 12/277,380

(22) Filed: Nov. 25, 2008

(65) Prior Publication Data

US 2009/0134718 A1    May 28, 2009

Related U.S. Application Data

(60) Provisional application No. 60/990,524, filed on Nov. 27, 2007.

(51) Int. Cl.
*H02J 7/00* (2006.01)
*H02J 9/00* (2006.01)

(52) U.S. Cl. ........................................ 307/150
(58) Field of Classification Search ............ 307/71, 307/150; 320/112, 118, 126–127
See application file for complete search history.

(56) References Cited

U.S. PATENT DOCUMENTS

| 4,658,623 A | 4/1987 | Blanyer et al. |
| 4,865,933 A | 9/1989 | Blanyer et al. |
| 4,909,955 A | 3/1990 | Morris et al. |
| 4,964,878 A | 10/1990 | Morris |
| 5,010,637 A | 4/1991 | Blanyer et al. |
| 5,173,652 A | 12/1992 | Henkel |
| 5,409,787 A | 4/1995 | Blanyer et al. |
| 5,696,526 A | 12/1997 | Kanbe et al. |
| 5,701,068 A | 12/1997 | Baer et al. |
| 5,925,470 A | 7/1999 | Blanyer et al. |
| 5,993,992 A * | 11/1999 | Field et al. ............ 429/158 |
| 6,027,822 A | 2/2000 | Blanyer et al. |
| 6,074,774 A | 6/2000 | Semmens et al. |
| 6,356,051 B1 | 3/2002 | Hasunuma et al. |
| 6,465,986 B1 | 10/2002 | Haba |

(Continued)

FOREIGN PATENT DOCUMENTS

CN       1290405 A       4/2001

(Continued)

OTHER PUBLICATIONS

European Patent Office Action for Application No. 08 855 626.1, dated Jan. 24, 2011, 4 pages.

(Continued)

*Primary Examiner* — Jared Fureman
*Assistant Examiner* — Carlos Amaya
(74) *Attorney, Agent, or Firm* — Fish & Richardson P.C.

(57) ABSTRACT

A battery pack connection scheme is shown that provides an optimum DC environment for every cell in the pack, such that every cell in the same or similar voltage level in the pack sees exactly the same voltage and current environment. In some examples, a portable pack is provided having a positive load connection terminal and multiple batteries connected in parallel to the terminal. Connections are made with segments preferably have matching impedances, or have matching DC resistances, creating a uniform DC environment. Portable pack designs are provided including chargers and inverters connected in the uniform DC environment.

19 Claims, 23 Drawing Sheets

U.S. PATENT DOCUMENTS

| | | |
|---|---|---|
| 6,504,342 B2 | 1/2003 | Inui et al. |
| 6,932,651 B2 | 8/2005 | Mita et al. |
| 6,935,020 B2 | 8/2005 | Ikeda |
| 7,808,131 B2 | 10/2010 | Hurst et al. |
| 2001/0052837 A1 | 12/2001 | Walsh |
| 2002/0171390 A1 | 11/2002 | Kruger et al. |
| 2005/0031945 A1 | 2/2005 | Morita et al. |
| 2005/0156564 A1 | 7/2005 | Krieger |
| 2005/0269995 A1 | 12/2005 | Donnelly et al. |
| 2006/0177734 A1 | 8/2006 | Yao |
| 2008/0124617 A1 | 5/2008 | Bjork |

FOREIGN PATENT DOCUMENTS

| | | |
|---|---|---|
| EP | 1689009 A1 | 8/2006 |
| WO | WO 99/00858 | 1/1999 |

OTHER PUBLICATIONS

International Search Report and Written Opinion of the International Searching Authority for Application No. PCT/US2007/081082, dated Sep. 11, 2008, 11 pages.

The State Intellectual Property Office of the People's Republic of China, Notice on the First Office Action for Application No. 20078042806.5, mailed Oct. 28, 2010, 13 pages.

The State Intellectual Property Office of the People's Republic of China, Notice on the Second Office Action for Application No. 20078042806.5, mailed Feb. 13, 2012, 12 pages.

\* cited by examiner

PORTABLE POWER PACKS HAVING A UNIFORM DC ENVIRONMENT

This application claims the benefit of the filing date of U.S. Provisional Application No. 60/990,524, which was filed on Nov. 27, 2007. The contents of U.S. Application No. 60/990,524 are incorporated by reference in their entirety as part of this application.

TECHNICAL FIELD

This invention relates to power supplies, and more particularly to battery packs or battery power systems and their associated wiring, charging, and discharging.

BACKGROUND

In order to achieve acceptable performance, most battery packs require frequent conditioning cycles and/or an active battery management system. Conditioning cycles bring the pack slowly up to full charge which attempts to equalize the state of the batteries in the pack. To equalize batteries means to reduce the gap between the weakest and strongest cell. Active battery management addresses this issue by providing a small localized charge or discharge across individual cells. Active battery management keeps the strongest and weakest cells closer to the average cell. This results in better pack performance but still well under the performance of an individual cell. Conditioning cycles are still required, but not as often as a pack without a battery management system.

A typical battery management system uses transistors in series with each cell to locally control the charge or discharge of the cell. Such systems typically dissipate extra power, limit pack capacity, and add expense to pack design and production. This is especially true for large, high power battery packs.

Typical portable power packs suffer from low power densities resulting in either low capacity packs or large packs with limited portability. Low power density thus limits the use of conveniently portable power packs in industrial power applications.

What is needed are circuits and methods to combine battery cells in high power portable battery packs or power supply systems to improve capacity, charge and discharge rates, lifespan, and other performance characteristics.

SUMMARY

In order for a pack to perform at an optimum condition, each cell is connected in a pack configured to provide the same DC environment as the any other cell in the pack. Power pack construction schemes are shown that provide an optimum DC environment for every cell in the pack, such that every cell in the same or similar voltage level in the pack sees an identical, or very similar, voltage and current environment.

In one example, a power supply module is provided having multiple battery units, a charger, and an inverter inside a housing. A conductive assembly connects the multiple battery units in parallel and passively prevent voltage divergence of the multiple battery units. The connections are made via respective conductive paths each having an under-load resistance differing from an under-load resistance of each of the other conductive paths by less than 1 milli-ohm. The inverter is coupled to the conductive assembly and provides an AC voltage to an output connection terminal of the power supply module. The charger is also coupled to the conductive assembly and is operable to charge the multiple battery units from a power input. One preferred implementation has a 5,000 Watt continuous power capability and a weight of less than 215 pounds or less than 97.6 kilograms. Another preferred implementation has a 10,000 Watt continuous power capability and a weight of less than 325 pounds or less than 147.5 kilograms. In one preferred implementation, the module has a capacity of at least 2000 Watt-hours. In one preferred implementation, the module has a capacity of at least 4000 Watt-hours.

In one example, a power supply module is provided having multiple battery units, a charger, and an inverter inside a housing. A conductive assembly connects the multiple battery units in parallel and passively prevent voltage divergence of the multiple battery units. The connections are made via respective conductive paths each having an under-load resistance matched to an under-load resistance of each of the other conductive paths. The inverter is coupled to the conductive assembly and provides an AC voltage to an output connection terminal of the power supply module. The charger is also coupled to the conductive assembly and is operable to charge the multiple battery units from a power input. One preferred implementation has a 5,000 Watt continuous power capability and a weight of less than 215 pounds or less than 97.6 kilograms. Another preferred implementation has a 10,000 Watt continuous power capability and a weight of less than 325 pounds or less than 147.5 kilograms. In one preferred implementation, the module has a capacity of at least 2000 Watt-hours. In one preferred implementation, the module has a capacity of at least 4000 Watt-hours. In some examples, the conductive paths also have matching electrical lengths and/or impedances.

In some examples, the power supply module is in the form of a self-supporting moveable power pack. In some examples, the multiple battery units include sealed lead acid batteries and the module has a capacity of at least 2000 Watt-hours and a weight of less than 215 pounds or less than 97.6 kilograms. In some examples, the conductive assembly includes high power DC cables, and/or at least one busbar.

In some examples, the conductive assembly includes a positive busbar and a negative busbar. In some implementations, the positive and negative busbars are conductively coupled to the inverter through conductors having a length shorter than lengths of the multiple conductive paths connecting the respective battery units to the positive and negative busbars. Further, in some implementations, the charger is electrically connected to the positive and negative busbars.

Another preferred implementation has four 12V batteries, a 4000 Watt-hour capacity, and a 10,000 Watt continuous power capability at the inverter 110V output. Preferably, this implementation has a weight of less than 325 pounds or less than 147.5 kilograms. Preferably, the power pack is a self-supporting moveable power pack. For example, the 2000 Watt-hour pack may be arranged in a casing with a 33.2 in. length and a 11.7 in. by 14.25 in. cross section. The 4000 Watt-hour pack may be arranged in a casing with a 33.2 in. length and a 11.7 in. by 19 in. cross section.

In some examples, the power pack may include multiple sealed lead acid batteries and have a capacity of at least 2000 Watt-hours and a weight of less than 215 pounds or less than 97.6 kilograms.

In some examples, the connections may be made via respective conductive paths each including high-power precision-matched DC conductors including cables and/or a positive or negative busbar. In some examples, the power pack includes a positive and a negative busbar connected to the positive and negative battery terminals, respectively. Preferably, the conductors coupling the busbars to the input terminal of the inverter have a length shorter than the lengths of the conductors connecting the battery terminals to the busbars.

In some examples, a portable power pack is provided having a positive bus and a negative bus and a conductive assembly connecting multiple battery units in parallel between the positive and negative buses. The conductive assembly is adapted to passively prevent voltage divergence of the multiple battery units and includes multiple high-capacity cables having precision matched lengths. Preferably, each high-capacity cable connects to a respective battery unit and has an under-load resistance matched to an under-load resistance of each of the other high-capacity cables. The pack also includes an inverter having a positive DC input terminal connected to the positive bus and a negative DC input terminal connected to the negative bus. Preferably, the conductive paths connecting the battery cathodes to the positive DC input terminal of the inverter have matched electrical lengths. A charger is also connected to the conductive assembly to charge the multiple battery units. Preferably, the conductive paths connecting the battery cathodes to the positive terminal of the charger have matched electrical lengths. One preferred implementation includes two 12V batteries, a 2000 Watt-hour capacity, and a 5000 Watt continuous power capability at the inverter AC output. Another preferred implementation includes four 12V batteries, a 4000 Watt-hour capacity, and a 10,000 Watt continuous power capability at the inverter AC output.

In some examples, a portable power pack is provided having an inverter, a charger, and multiple battery units connected in parallel inside a housing. The inverter is connected to the batteries and is capable of outputting at least 5,000 Watts of continuous power at an AC voltage terminal at the exterior of the housing. The charger is connected to the batteries to charge the batteries from a power input. In one preferred implementation, the portable power pack has a capacity of at least 2000 Watt-hours, a weight of less than 215 pounds or less than 97.6 kilograms, and is capable of outputting at least 5,000 Watts of continuous power to an AC voltage terminal. In another preferred implementation, the portable power pack has a capacity of at least 4000 Watt-hours, a weight of less than 325 pounds or less than 147.5 kilograms, and is capable of outputting at least 10,000 Watts of continuous power to an AC voltage terminal.

In some examples, each conductor has a resistance suitable to allow an average charge acceptance rate of the battery pack to be greater than a one-hour, or "C1", charge rate. The precision conductor segments preferably have matching impedances, or have matching DC resistances. This may be achieved, for example, by precisely matching cable or other conductor lengths. Connections and fittings to the battery terminals and to the positive load connection terminal are also preferably precision matched to each other. In some examples, one or more additional parallel-connected sets of batteries may be connected in series with the parallel set. The parallel connections are preferably made with matching conductors. One preferred construction of conductive fittings and electrical busses includes silver-plated soft copper.

In other examples, a battery pack is provided having a positive load connection terminal with batteries connected to it with parallel conductive paths, each path having an under-load resistance differing from that of the of other parallel conductive paths by less than 10 milli-ohms, and in some implementations having very low impedance precision DC cabling, the under load resistance differs by less than 1 milli-ohm. The conductive paths may include cables and a respective conductive portion of a terminal bus. The cables may be connected to the terminal bus at equal spacing, thereby providing equal resistive paths between them. One such connection arrangement is done on a circular terminal bus having the positive load connection terminal coupled at its center. In some examples, the loaded series impedance of the batteries is as similar as possible, and the loaded series impedance of the parallel conductive paths is at least five times greater than that of the batteries.

Various examples may have multiple rows of parallel-connected batteries arranged in a series to provide higher output voltage. Similar parallel conductive arrangements may be made at the positive and negative ends of such a matrix.

In some examples, the batteries are low-impedance batteries allowing fast charging and discharging. Some examples employ lead-acid batteries having an open circuit resistance of 1-2 milli-ohms. Batteries are preferably selected to have, as closely as possible, identical electrical properties. Compression cages may be used to compress swollen batteries to conform their physical and electrical characteristics to a certain standard, or to prevent swelling of batteries that may deleteriously affect their chemistry. Capacitors or other suitable energy storage units may be substituted for batteries in some examples.

Another example provides a battery pack comprising a multiple means for storing energy, and a connection means for electrically connecting the multiple means for storing energy together and preventing discharge-rate divergence during use.

Other examples provide methods of assembling a power pack enclosed in a housing including connecting multiple battery units in parallel with a conductive assembly that passively prevents voltage divergence of the multiple battery units, and includes multiple conductive paths, each connecting to a respective battery unit and each having an under-load resistance differing from an under-load resistance of each of the other conductive paths by less than 1 milli-ohm; connecting an inverter in the housing to the conductive assembly, the inverter presenting an AC voltage at an output connection terminal of the power pack; and connecting a charger in the housing to the conductive assembly, the charger operable to charge the multiple battery units from a power input.

Other examples provide methods of assembling a power pack enclosed in a housing including connecting multiple battery units in parallel with a conductive assembly that passively prevents voltage divergence of the multiple battery units, and includes multiple conductive paths, each connecting to a respective battery unit and each having an under-load resistance matched with an under-load resistance of each of the other conductive paths; connecting an inverter in the housing to the conductive assembly, the inverter presenting an AC voltage at an output connection terminal of the power pack; and connecting a charger in the housing to the conductive assembly, the charger operable to charge the multiple battery units from a power input. In some examples, the method also includes matching the respective electrical lengths and/or impedances of the multiple conductive paths.

Other examples provide methods of supplying power from a power pack enclosed in a housing, in which the power pack includes multiple batteries connected in parallel and the method includes simultaneously discharging the multiple batteries connected by a conductive assembly that passively prevents voltage divergence of the multiple battery units and includes multiple conductive paths, each connected to a respective battery unit and each having an under-load resistance differing from an under-load resistance of each of the other conductive paths by less than 1 milli-ohm; converting power produced from discharging the multiple batteries to AC power; and supplying the AC power to an AC output connector for power transfer from the power pack to an external load.

Other examples provide methods of supplying power from a power pack enclosed in a housing, in which the power pack includes multiple batteries connected in parallel and the method includes simultaneously discharging the multiple batteries connected by a conductive assembly that passively prevents voltage divergence of the multiple battery units and includes multiple conductive paths, each connected to a respective battery unit and each having an under-load resistance matched with an under-load resistance of each of the other conductive paths; converting power produced from discharging the multiple batteries to AC power; and supplying the AC power to an AC output connector for power transfer from the power pack to an external load.

Other examples provide methods of mitigating battery characteristic divergence within a battery pack, the method including choosing multiple batteries each having, as closely as possible, equal loaded output resistance and charge acceptance characteristics; connecting the multiple batteries in parallel in a battery pack; charging the multiple batteries simultaneously after connecting the multiple batteries in parallel; while charging the multiple batteries simultaneously, maintaining equal charging voltages across each of the multiple batteries; and while charging the multiple batteries simultaneously, maintaining equal charge-acceptance rates in each of the multiple batteries. Some examples may include the steps of discharging the multiple parallel-connected batteries simultaneously into a load; while discharging the multiple batteries simultaneously, maintaining equal discharging voltages across each of the multiple batteries; and while discharging the multiple batteries simultaneously, maintaining equal discharge currents in each of the multiple batteries.

Some examples provide methods of supplying electrical power from a portable battery pack including multiple batteries connected in parallel and having as closely as possible matched load resistance and discharge rate characteristics. One preferred example includes discharging the multiple batteries simultaneously while passively maintaining equal discharging voltages and rates for each of the multiple batteries; converting the power produced from discharging the batteries to AC power; and supplying the AC power to an output connector for power transfer to an external load.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 8A is a circuit diagram of the power system.

FIG. 8B is a circuit diagram of a negative bus.

FIG. 8C is a circuit diagram of a positive bus.

FIG. 9A is a circuit diagram of the power system.

FIG. 9B is a circuit diagram of a negative bus.

FIG. 9C is a circuit diagram of a positive bus.

Like reference symbols in the various drawings indicate like elements.

Like reference symbols in the various drawings indicate like elements.

DETAILED DESCRIPTION

Figure 1A:
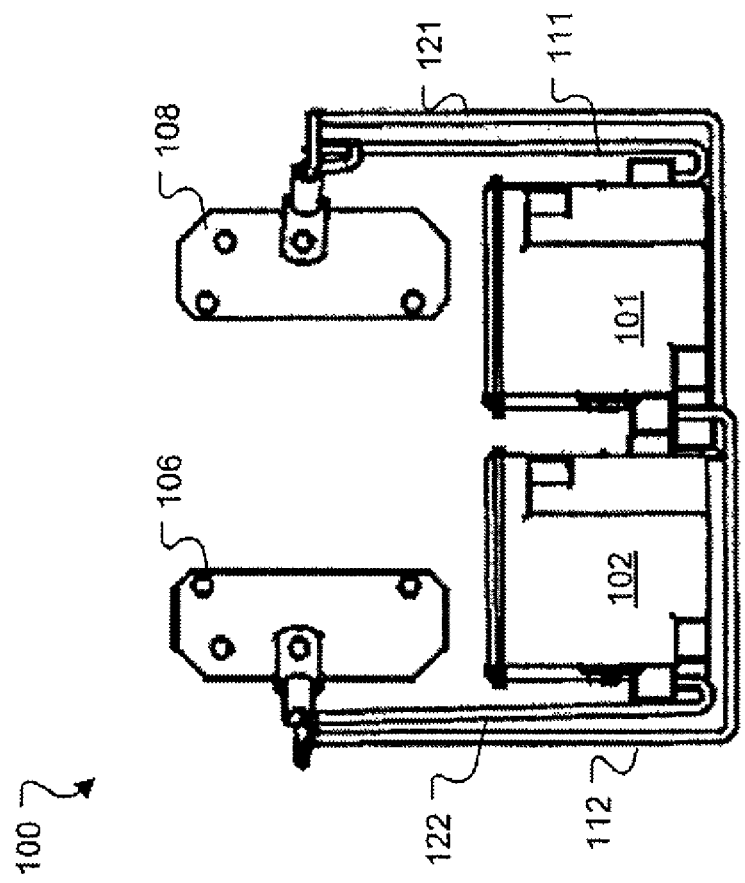
FIGS. 1A-1C show a battery pack formed from two batteries connected in parallel using precision conductors.
Figure 1B:
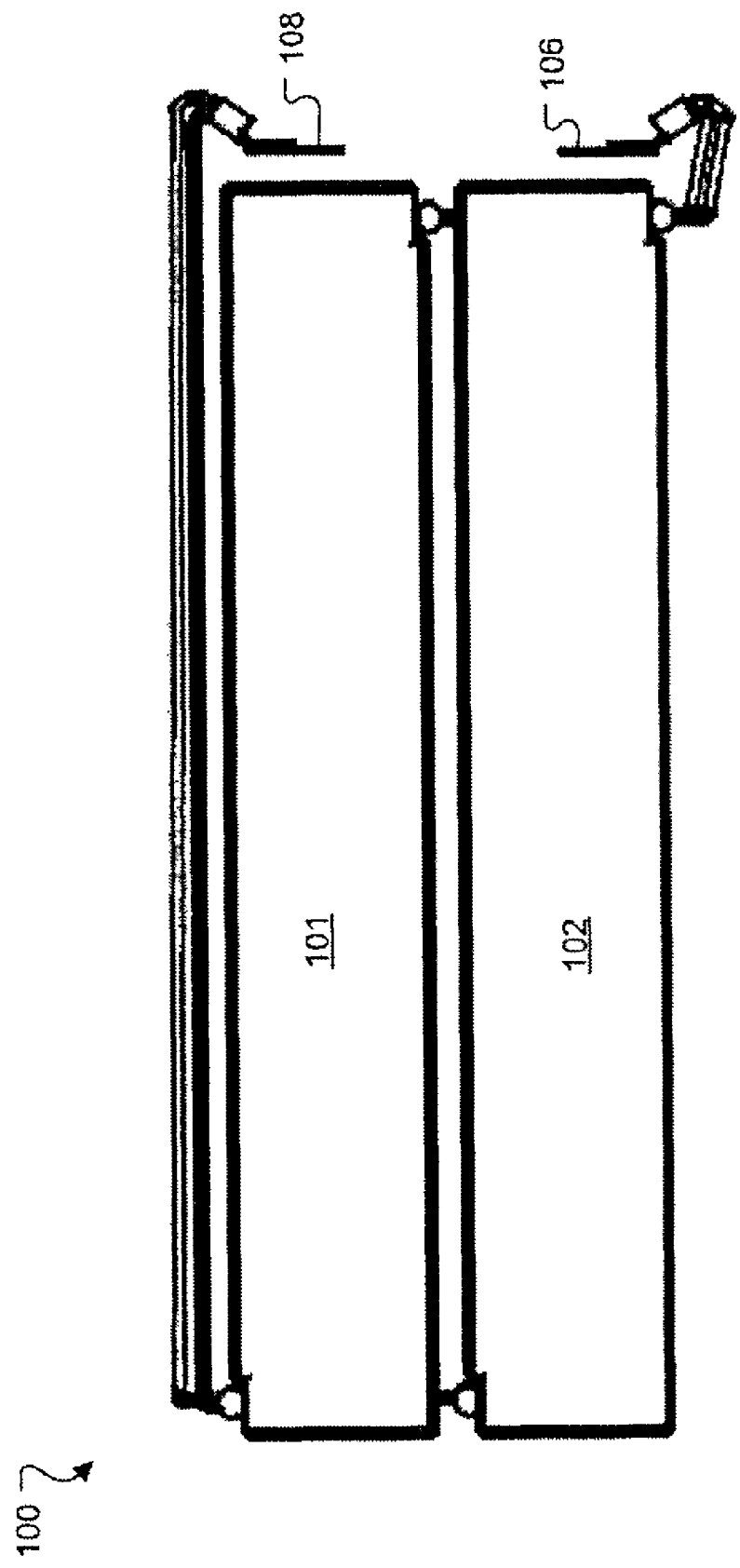
Figure 1C:
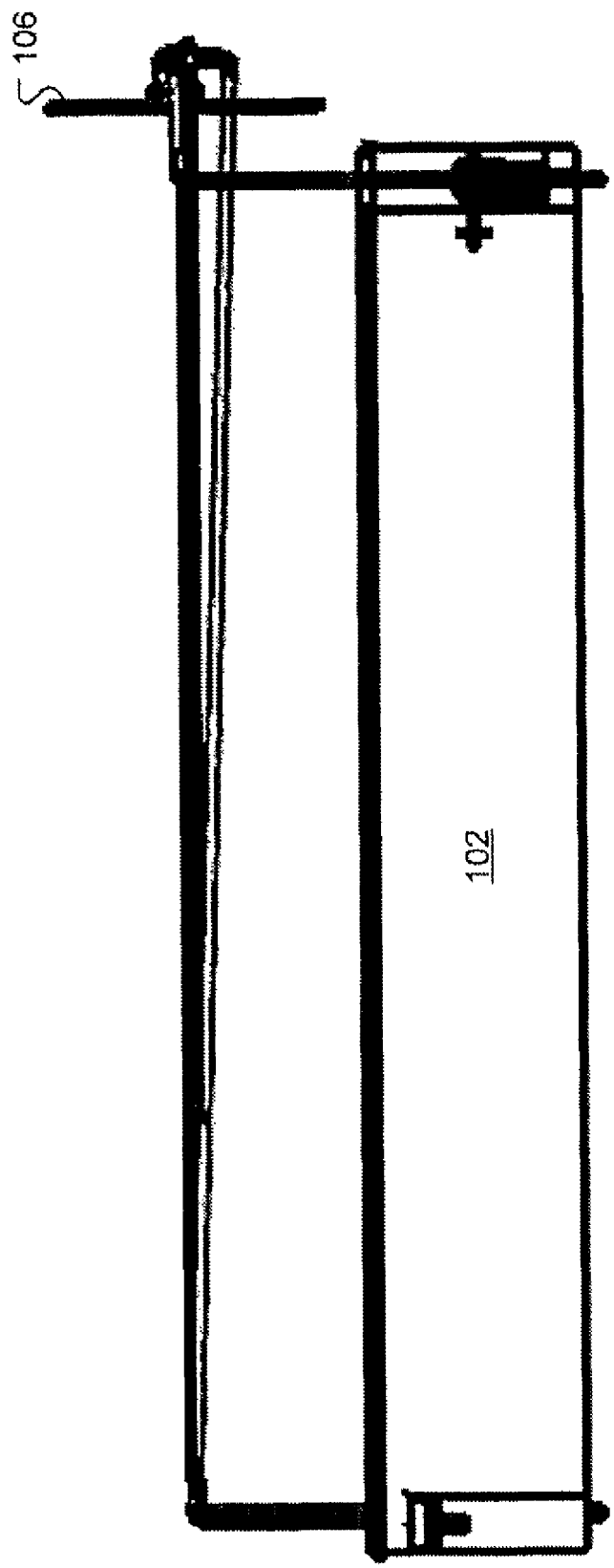

FIGS. 1A-1C show a battery pack formed from two batteries connected in parallel using precision conductors. FIGS. 1A, 1B, and 1C show a front view, a top view and a side view, respectively, of the battery pack.

In general, a battery pack 100 may have batteries 101, 102, a positive busbar 106, a negative busbar 108, and cables 111, 112, 121, 122. The batteries 101, 102 may supply similar voltages and currents. The cables 111, 112, 121, 122 connect the batteries 101, 102 to the busbars 106, 108 in a parallel fashion. In this example, the busbars 106, 108, supply the voltage and combined current to an external load. As a result, in the example depicted in FIGS. 1A-1G, a device connected to the battery pack receives a voltage equivalent to that provided by a single battery and a current equal to the sum of the individual battery currents. Batteries 101 and 102 have similar construction to ensure they have similar electrical characteristics. For example, the batteries 101 and 102 may use the same chemistry, have the same dimensions, etc. As a result of their similar construction, the batteries 101 and 102, have nearly identical voltage and current output curves when the same load is applied to each battery.

Batteries 101 and 102 may be a common type. For instance, they may be a sealed lead acid battery. Batteries 101, 102 used in the battery pack 100, and in other examples, may be individual cells or multiple cells. For example, in one instance, the batteries 101, 102 may each be a single 12 volt cell; in other instances, each battery may be a combination of multiple cells, such as 12 volt battery consisting of eight 1.5 volt cells connected in series. In one example, the batteries 101, 102 may have a rated capacity of 2000 Watt-hours.

In some instances, the batteries 101, 102 may be rechargeable; in this case, the battery pack may be replenished by applying an external voltage to the battery pack busbars 106, 108. For example, if the batteries 101, 102 are of a sealed lead acid type, such as those found in some automotive or industrial applications, the battery pack may be charged by connecting a standard battery charger to the battery pack busbars. In some preferred examples, the batteries employed herein are sealed lead-acid batteries such as those described in U.S. Pat. Nos. 6,074,774 and 6,027,822, which are hereby incorporated by reference in their entirety for all purposes. Batteries used herein preferably have the lowest series impedance possible for the chemistry used, with some preferred examples of the lead-acid batteries employed having an open circuit series impedance of 5-10 milli-ohms or less. Series impedance varies greatly among different battery designs.

Other battery chemistries may be used depending on the desired applications, operating environments, and costs. For example, Ni-Cad, NiMH, Li-Polymer, Li-Ion, or any other suitable batteries may be used.

In some examples, the cables 111, 112, 121, 122 are manufactured as identically as possible to ensure that they have similar electrical characteristics to each other within a given battery pack. In the depicted example, the cables 112 and 122 have characteristics as closely as possible identical to each other. Cables 111 and 121 are similarly identical to each other, and may be identical to cables 112 and 122, ensuring similar electrical characteristics as seen by the batteries 101, 102 looking to load busbar 106. If the loads applied to the two batteries are similar and the batteries themselves are similar, the batteries are likely to drain at the same rate and retain similar voltages. As a result, the batteries tend to be drained at a similar rate without the use, in this example, of any active battery management systems or other active battery management circuitry present between batteries 101, 102 and load busbar 106 and 108.

The cables 111, 112, 121, 122 are preferably precision manufactured to reduce variability. In some instances, the cables 111, 112, 121, 122 may be manufactured from the same material lots for creating a single set. For example, all the cables for a battery pack may be manufactured a single piece of cabling. Use of a single source of material used for constructing cables may reduce the likelihood of variation in electrical variation due to, for example, variations in wire looping, insulation, etc.

Figure 1D:
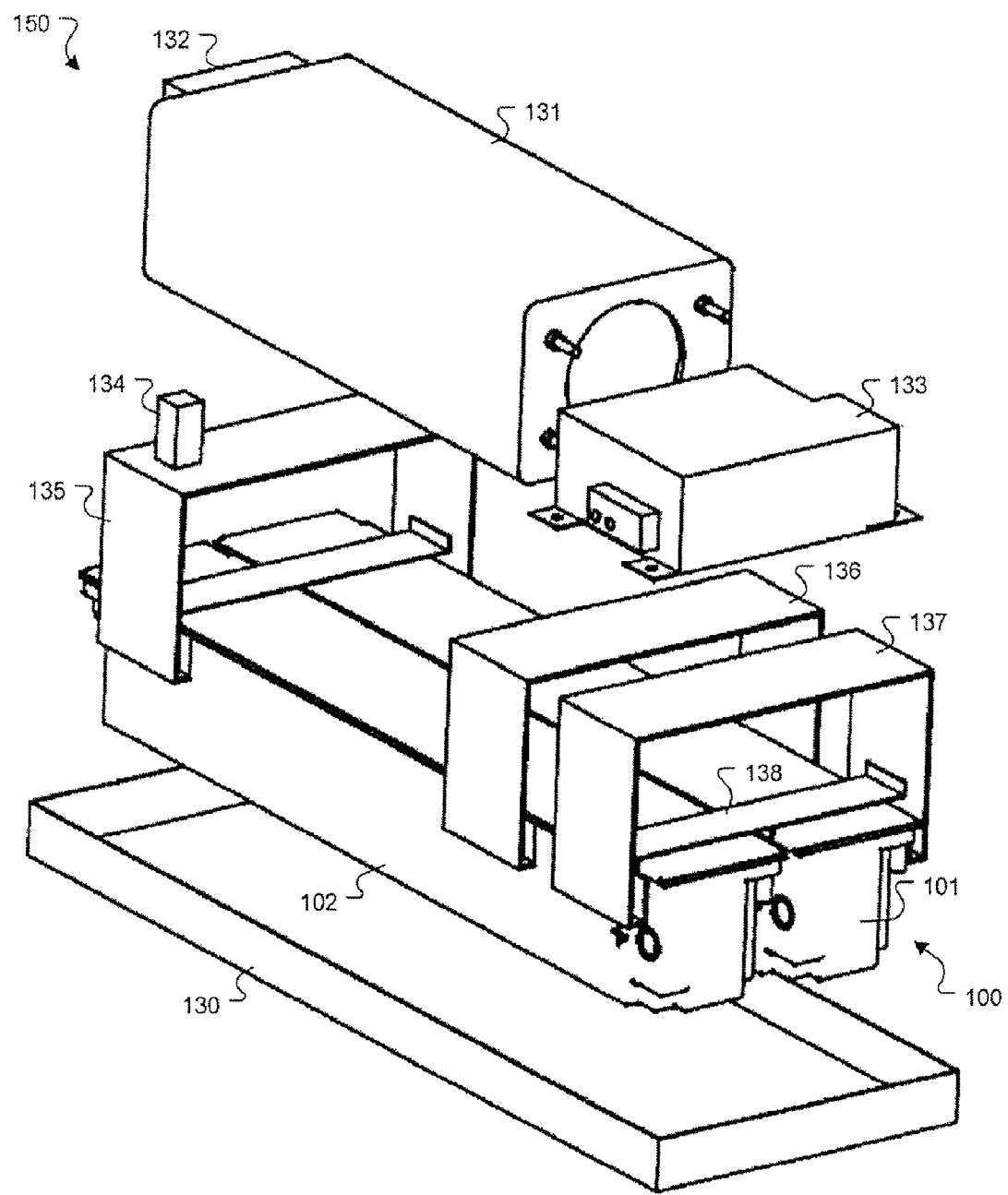
FIGS. 1D-1F are representations of the assembled battery pack.

FIG. 1D shows a battery pack assembly 150 that includes the battery pack 100. Although the battery pack busbars 106, 108 and the cables 111, 112, 121, 122 are not shown in FIG. 1D for clarity of the drawing, nevertheless, the battery pack busbars 106, 108 and the cables 111, 112, 121, 122 are part of the battery pack assembly 150.

The battery pack assembly 150 includes a battery tray 130 and battery brackets 135, 136, 137 for holding the batteries 101, 102 in position. Each of the battery brackets 135, 136, 137 includes a battery tie down 138. For example, the battery tie down 138 may hold the batteries 101, 102 towards the battery tray 130.

The battery pack assembly 150 includes an inverter 131, a fan 132, a charger 133, and a fan relay 134. The inverter 131 can convert DC power from the batteries 101, 102 into AC power. In one example, the inverter 131 can convert DC power of the batteries 101, 102 into an AC power output of substantially 115 VAC with a frequency of substantially 60 Hz. In some examples, the inverter 131 can generate an output AC power with different voltage and/or different frequency. For example, the inverter 131 can generate an AC power output of substantially 220 VAC. In some examples, the AC power output can have a frequency of substantially 50 Hz. In one example, the inverter 131 can be a power inverter capable of outputting electrical power of 5000 W continuously. For example, the inverter 131 may be configured to have a peak output power of 7200 W.

The fan 132 may operate to reduce operating temperature of the battery pack assembly 150. For example, the fan 132 is enabled or disabled by the fan relay 134. In some examples, the battery pack assembly 150 may include an over temperature shutdown feature. For example, the battery pack assembly 150 may disable operation if overheating is detected. A preferred example also includes a modification to typical inverter fan control, which runs the cooling fan after the inverter circuit is deactivated to prevent post-operation heating and damage.

The charger 133 charges the batteries 101, 102. For example, the charger 133 may be configured to charge the batteries 101, 102 if external power is available. In one example, the charger 133 receives external power of substantially 950 W having an input voltage of substantially 108-132 V. In one example, other voltages (e.g., 200-220 V) may also be received to recharge the batteries 101, 102. In some examples, the charger 133 may generate an output current of, for example, 55 amps, to recharge the batteries 101, 102. For example, the batteries 101, 102 may be recharged at substantially the same rate without the use, in this example, of any active battery management transistors or other active battery management circuitry present between batteries 101, 102 and the charger 133.

In some examples, the cables 111, 112, 121, 122 can be positioned near the charger 133 and a DC input of the inverter 131. The cables 111, 112, 121, 122 can be bolted or otherwise directly coupled to the inputs. In some examples, the cables 111, 112, 121, 122 can be connected thereto with a conductor shorter than the conductor connecting the batteries 101, 102 and the cables 111, 112, 121, 122. Such arrangement helps equalize conductor currents from the charger 133 to each of the batteries 101, 102, and from each of the batteries 101, 102 to the inverter 131.

Figure 1E:
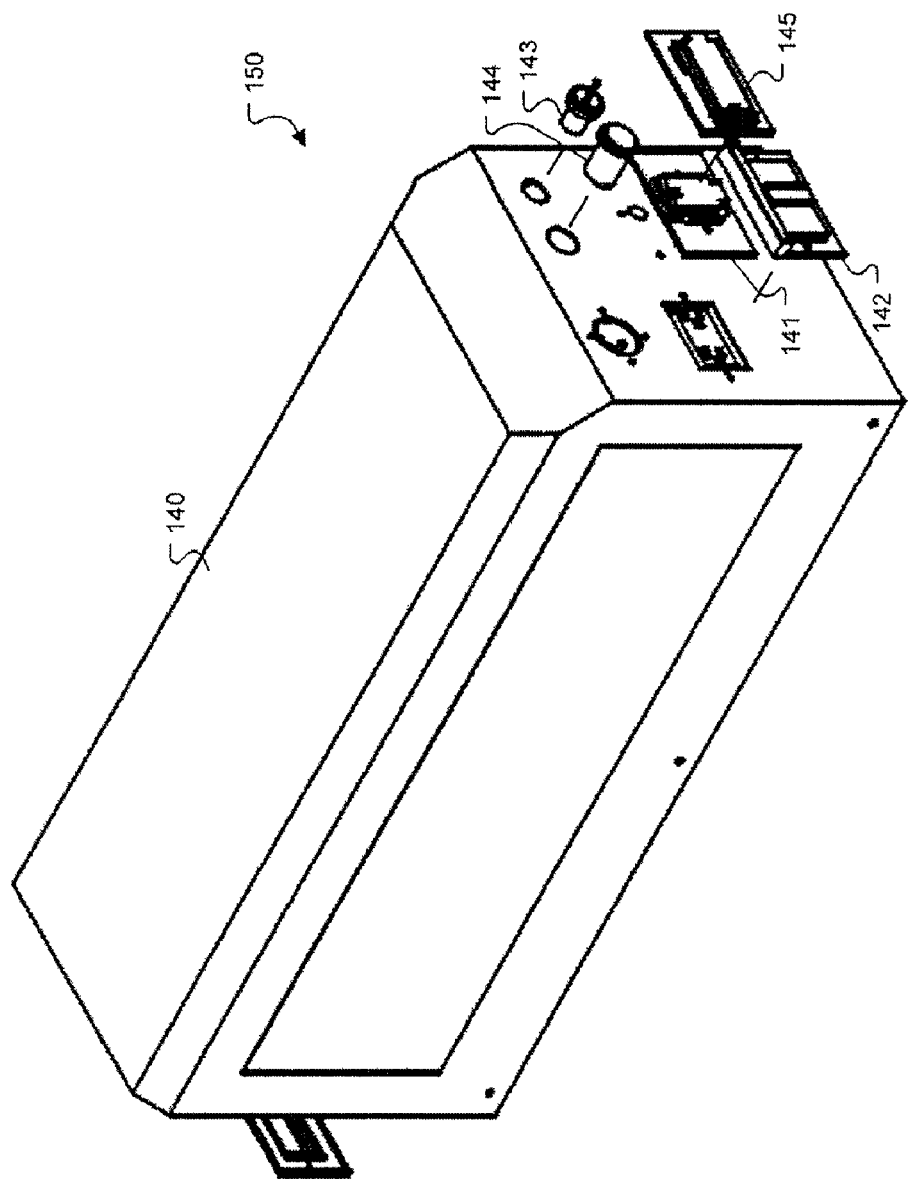

FIG. 1E shows a perspective view of an exterior of the battery pack assembly 150. As shown, a housing 140 encloses the battery pack assembly 150. At the front of the housing 140, the battery pack assembly 150 includes a charger power inlet 141, an AC power outlet 142, a power switch 143, a 12 VDC power outlet 144, and a 20 amp breaker 145. Using the power switch 143, a user can enable or disable operations of the battery pack assembly 150.

The charger 133 can receive power from the charger power inlet 141 to recharge the battery power. The AC power outlet 142 outputs AC power from the inverter 131. In some examples, the AC power outlet 142 can be a duplex 20 amp ground fault circuit interrupter (GFCI) outlet that is configured to monitor the amount of current flowing from hot to neutral at the power outlet.

Figure 1F:
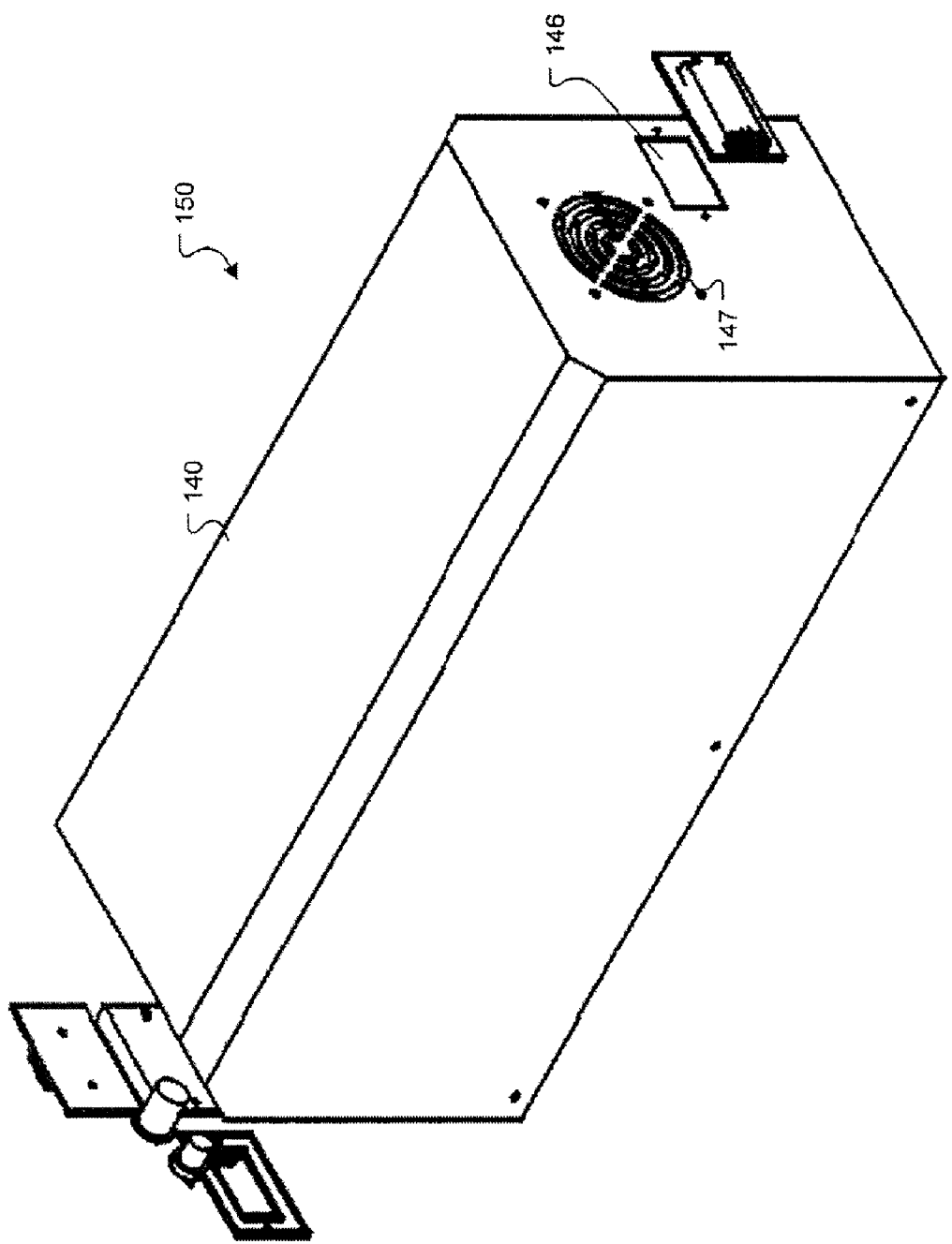

FIG. 1F shows a back view of the exterior of the battery pack assembly 150. In the depicted example, the battery pack assembly 150 includes an Anderson connector 146 and a fan vent 147. For example, the Anderson connector 146 may be a 350 amp Anderson connector for supporting high current load. The fan vent 147 is an air outlet of the fan 132.

Figure 1G:
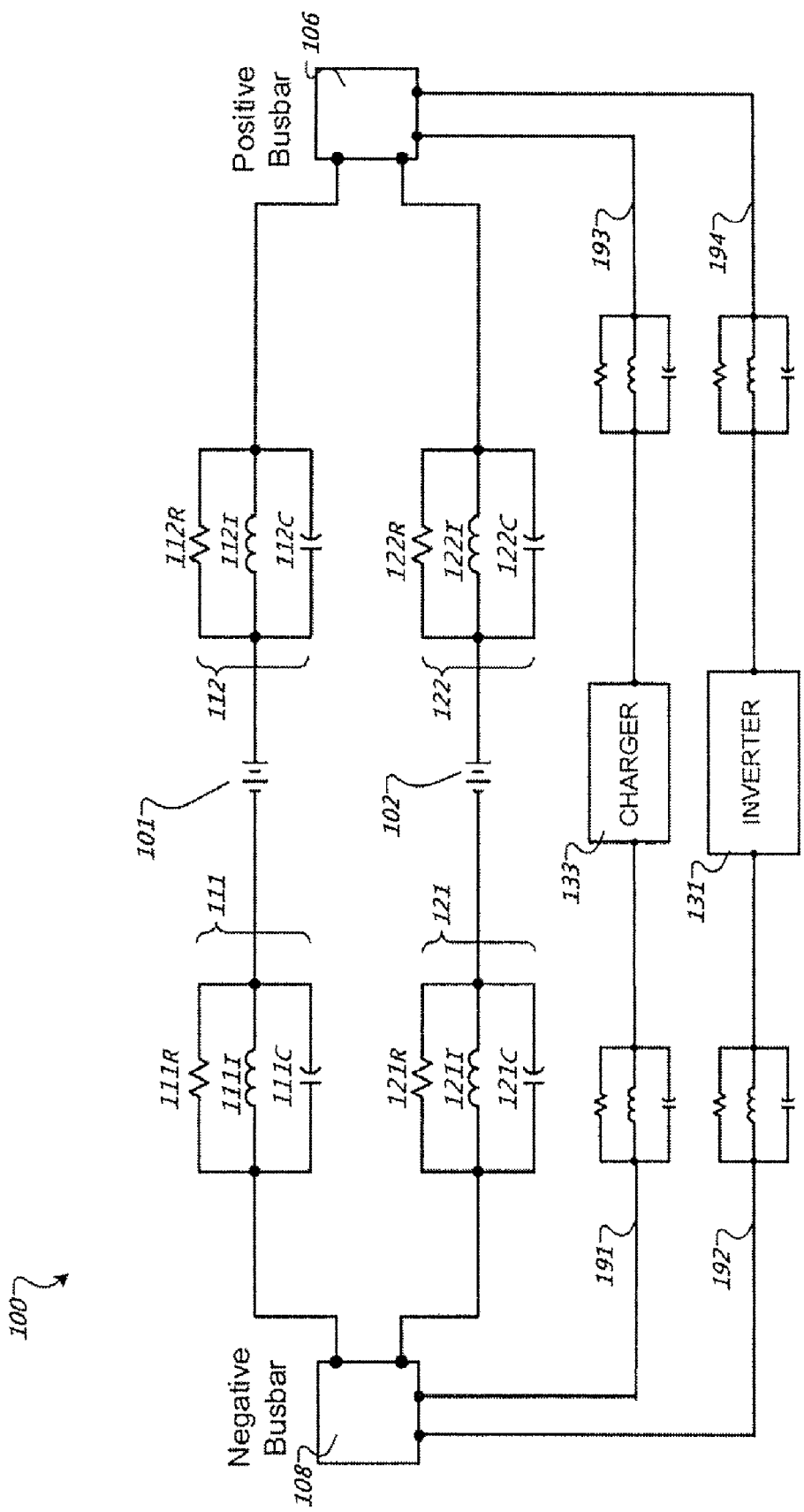
FIG. 1G is a circuit diagram of the battery pack shown in FIG. 1A.

FIG. 1G is a simplified circuit diagram of the battery pack shown in FIG. 1A. The charger and inverter are removed for simplicity, but are depicted, for example, in FIG. 8. The first cable 111, first battery 101, and second cable 112 form a parallel circuit with the third cable 121, second battery 102, and fourth cable 122. Resistance, inductance, and capacitance are modeled for each cable. For example, the first cable 111 has a corresponding resistance 111R, an inductance 111I, and a capacitance 111C. The second cable 112 has a corresponding resistance 112R, an inductance 112I, and a capacitance 112C. The third cable 121 has a corresponding resistance 121R, an inductance 121I, and a capacitance 121C. The fourth cable 122 has a corresponding resistance 122R, an inductance 122I, and a capacitance 122C.

In the depicted example, the circuit branch consisting of cable 111, battery 101 and cable 112 is very similar and preferably identical to the branch consisting of cable 121, battery 102 and cable 122. The depicted cables 111, 121, 112, and 122 are preferably high power DC cables each comprising at least one high power DC precision cable segment. Such high power DC cables are preferably of the same length, material, and cross section. The resistance of the cables and connections is preferably as low as possible. Their length is preferably matched by precision measurement and cutting techniques to ensure accuracy. Further, the connections to each depicted battery terminal are also preferably identical. This may be accomplished by carefully controlled soldering techniques in the attachment of connectors, as well as selecting electrically identical washers, bolts, plugs, prongs, or other electrical fittings to ensure the electrical resistance and other characteristics are identical or, as closely as possible, similar at each respective parallel connection. Such connections create uniform parallel conductive paths from parallel-connected batteries 101 and 102 to the output busbars 108 and 106.

For example, as depicted in FIGS. 1A and 1G, there are uniform parallel conductive paths comprising, in order, as contained in this example: the bolted connection from the positive terminals of batteries 101 and 102; the transitioning conductive connection from the fitting bolted to each battery terminal to the cable conductor in each of cables 112 and 122; the cables 112 and 122; the cable-to-fitting conductive connection at the positive busbar 106 end of each cable 112, 122; the fitting at such ends; and the conductive path portions of positive busbar 106 from each cable to a load connection point on the busbar. Each of these conductive portions is preferably identical or, as closely as possible, similar to its mirror image in the parallel conductive path. By "identical" it is meant, in this case, identical materials, size, shape, and electrical properties such as the identical electrical resistance, capacitance, and inductance illustrated in FIG. 1G. Where identical conductive portions are not possible or practical (such as, for example, where non-flexible conductors of different lengths are needed to span different physical distances), then the electrical properties of the conductive portions are made to be as similar as possible.

Precision conductive connections 191 and 193 connect charger 133 to the parallel-connected batteries 101-102. Connections 191 and 193 are precision conductive cables, preferably shorter than the cables such as 111 and 112 connecting battery terminals to the busbars 108 and 106. The charger terminals may also be conductively coupled directly to the busbar with conductive bolts or other fittings. The inverter is similarly connected with precision connections 192 and 194, also preferably short cables or directly coupled fittings. As can be seen toward the proximal end of depicted inverter 131 in FIG. 1D, inverter DC inputs may be hold or stud terminals to which busbars 108 and 106 may be attached. Such a scheme minimizes variations in conductive paths from the batteries to the inverter 131 load.

The impedance of the high-power precision DC cables, and the various connection fittings and solder connections that may be employed in construction of the examples herein, is preferably as low as possible under existing design constraints. In one example, this is achieved by using fittings and busbars that are copper with silver plating, although other suitable low-resistance and low loaded-inductance connections may be used. The silver to silver connections provide low impedance and low oxidation. The surface of the connections is preferably polished and processed with an oxidation inhibitor treatment to help ensure the extremely low resistance connections retain their characteristics for as long as possible. Further, preferred cables used herein are selected to be oversized for their power load requirement in order to reduce their series resistance. For example, high power precision DC cables used herein may be selected, for example, to work under a 50-amp current load. In some examples, high power DC cables are selected having a series resistance preferably as low as 10-50 milli-ohms under load. When expressed as a ratio of current to resistance (Amps/Ohms), this example provides a 5000/1 ratio at 10 milli-ohms, and a 1000/1 ratio at 50 milli-ohms. These characteristics are plainly a high power, low resistance cable. Other lower ratios, such as 750, 500, 250, and even 100 or less may be considered high-power in certain applications. In examples using several parallel batteries, "high power" could mean that each conductive path (each battery) provides 20 amps under normal operating conditions, for example, depending on how many batteries are in a pack. Connectors used herein may also be oversized to reduce their equivalent series resistance and enable such large currents without excessive power dissipation.

In preferred examples, the battery pack assembly 150 is portable. For example, the battery pack assembly 150 can be constructed to have light weight so that the assembly 150 can be easily carried. In the example 2000 Whr capacity pack, the battery pack assembly 150 can weight approximately 165 lbs. The battery pack assembly 150 may also be compact in size. In the same example, the housing 140 may be 33.2 in. length and 11.7 in. by 14.25 in. cross section.

While FIGS. 1A-1G depict uniform parallel conductive paths comprising cables and bolted electrical fittings, other example may use any suitable conductive materials and fittings to form the parallel conductive paths, provided respective parallel paths are preferably identical or, as closely as possible, similar. While precision matched-length high-power DC cables comprise the parallel conductive paths in some examples described herein, solid busbars, traces, or other conductors may also be used if they are suitable for the power load of the desired application.

The properties achieved by employing matched precision cables may also be achieved in some examples by employing low resistance busbar designs. For the busbar designs, it is imperative that each busbar section is identical and dimensionally equivalent, providing for identical resistance, capacitance, and inductance where such equivalence is required in the circuit. Similarly, precision cables are typically cables where the resistance, capacitance, and inductance are known or equal to other precision cables of the same design and construction. The construction of a precision cable is made by manufacturing matched cable sets which are constructed from the same cable roll (lot) using copper connectors that are silvered and crimped and soldered using exactly the same process. Small variations in the manufacturing process can lead to large differences in the cables. The matched cables are bench tested for consistency (or differences) before being put into a pack construction.

Resistance, inductance and capacitance values for cable 111 are very close to corresponding values for cable 121, creating a synchronized DC environment from negative busbar 108 to the negative battery terminals of each of batteries 101 and 102. Resistance, inductance and capacitance values for cable 112 are very close to corresponding values for cable 122, thereby creating a similar synchronized or matched DC environment from positive busbar 106 to the positive battery busbars of each of batteries 101 and 102. The batteries preferably have identical or, as closely as possible, similar electrical characteristics. As a result, power drawn from the batteries is similar if a load is placed on busbars 108, 106.

Under load, battery pack 100 provides a voltage and current output from busbars 106, 108. Since the electrical characteristics of the cables and batteries are similar or identical, the battery voltages are similar or, as closely as possible, identical. If the battery voltages are similar, current does not flow from one battery to the other under loaded or unloaded conditions. When a load is connected, similar current is drawn from both batteries 101, 102, causing them to be discharged at a similar rate. Such similar discharge helps maintain the matched electrical characteristics of the batteries and prevents divergence of such characteristics. Specifically, during the discharging process, the connecting circuitry preferably maintains an equal discharge current from each battery, and an equal voltage across each battery. Conversely, during the charging process, the connecting circuitry maintains an equal charge current to each battery and an equal voltage across each battery. The depicted circuit in FIG. 1B operates passively to match the DC current and voltage at the output terminals of batteries 101 and 102, which may be described as providing a synchronized DC environment Such a synchronized DC environment may be used to passively prevent divergence of battery performance characteristics, under discharge (loaded pack) and charge (charging pack) conditions. In some examples, the battery pack 100 is rechargeable. Since the two branches of the circuit are identical or similar, half of an applied charge is deposited in each battery. While the battery pack 100 is being charged, the batteries 101, 102 may be charged at an equal or, as closely as possible, similar rate such that, at any given time, the batteries 101, 102 have approximately the same amount of stored charge, thus maintaining the similarity of their electrical characteristics such as voltage, capacity, charge acceptance rate, and temperature.

Figure 2:
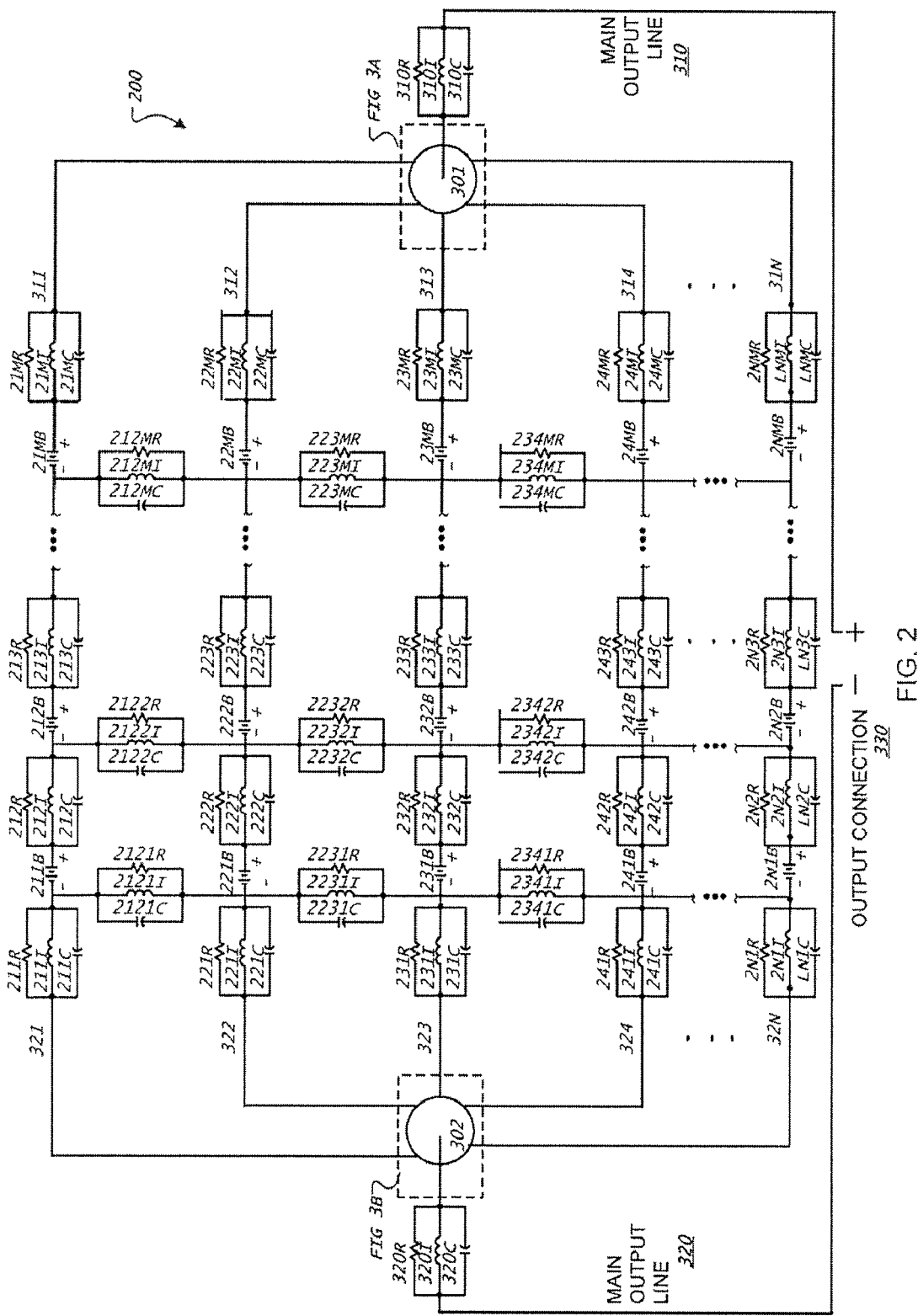
FIG. 2 is a generalized circuit diagram of a battery pack according to another implementation.
Figure 3B:
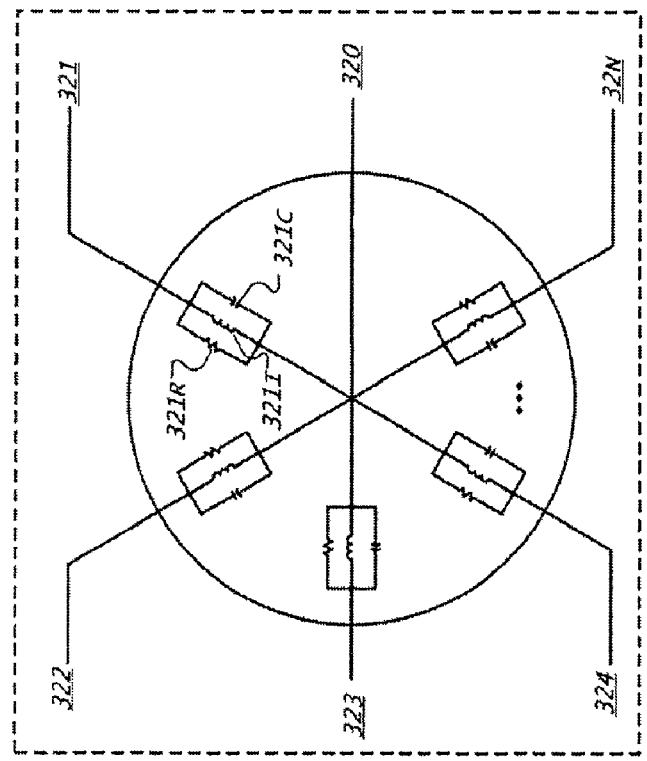
FIGS. 3A and 3B are more detailed circuit diagrams of the buses 301, 302 shown in FIG. 2.
Figure 3A:
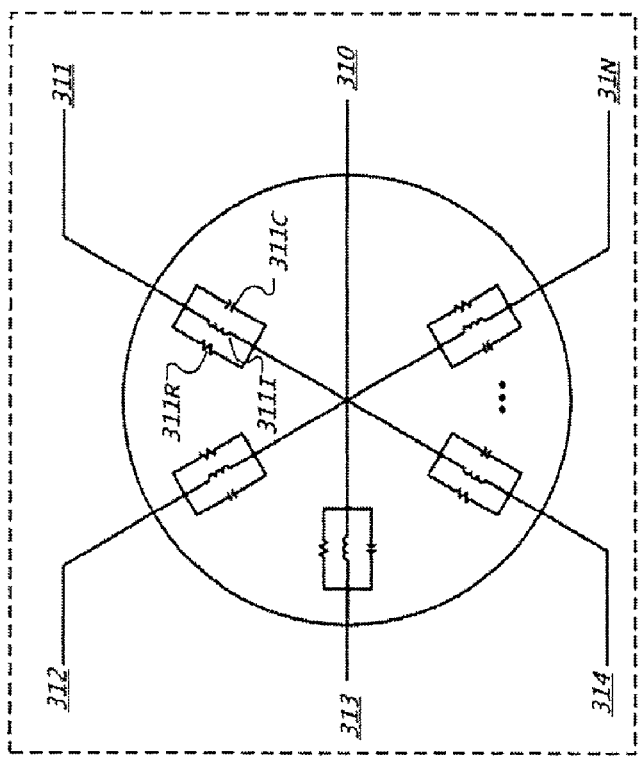

FIG. 2 is a generalized circuit diagram 200 of a battery pack according to another example. FIGS. 3A and 3B show elements of the circuit 200, regions 3A and 3B as marked with dotted lines in FIG. 2, in further detail. In general, circuit 200 has an array of batteries 211B-2NMB connected with precision conductors each represented by a resistor, inductor and capacitor such as 211R, 211I, and 211C. The array of batteries has batteries connected in series or parallel by the precision conductors. The array may provide or store electric power via the external interface. Particularly, arrangements of the battery array and precision conductors with many parallel batteries (columns in FIG. 2) result in a battery pack with high current capacity than a single row. Arrangements with many batteries in series (rows in FIG. 2) provide a higher voltage.

The depicted circuit 200 has an array of batteries and conductors. Reference numbers associated with elements of the array may indicate the type of the element and its position within the array. For most of the reference numbers in FIG. 2, the first digit of the reference number may indicate the figure number, the second digit may indicate a row position, and the third digit may indicate a column position with "N" and "M" corresponding to the final row or column in an array with N rows and M columns of batteries. Reference numbers ending with an "R" refer to the equivalent resistance of a conductor, reference numbers ending with an "I" refer to the equivalent inductance of a conductor, reference numbers ending with a "C" refer to the equivalent capacitance of a conductor, and reference numbers ending with a "B" refer to a battery.

The batteries in the circuit 200 should be of a similar type. For example, they should have the same chemistry and physical construction. In some examples, the batteries may be of a standardized lead-acid type, capable of high power output. As a result of similar chemistry and construction, the batteries should have similar electrical characteristics. For instance, the batteries may provide similar currents at a similar voltage when an identical load is applied across their positive and negative terminals.

The batteries in the depicted array are connected in series using precision conductors. A set of batteries are connected in series if the positive terminal of one battery is connected to the negative terminal of another battery. The output voltage of a series circuit is equal to the sum the voltages of the batteries that are in series. For instance, the first row of the circuit 200 may consist of batteries 211B, 212B, . . . , 21MB, and the voltage across the series is equal to the sum of the voltages of batteries 211B, 212B, . . . , 21MB. A second row in the array may consist of batteries 221B, 222B, . . . , 22MB also connected in series.

The batteries in the circuit 200 may be connected parallel using precision conductors. The current capacity of the system increases with the number of parallel branches. For example, a circuit with four parallel branches will have twice the current capacity of a circuit with two parallel branches. For instance, a first column in the depicted array consist of batteries 211B, 221B, 231B, 241B, . . . 2N1B connected in parallel; the current capacity of this portion of the circuit is equal to the sum of the currents capacity of the batteries 211B, 221B, 231B, 241B, . . . 2N1B.

Precision conductors may be modeled by a resistor, an inductor, and a capacitor. Each resistor, inductor, and capacitor in FIGS. 2 and 3A-B corresponds to the resistance, inductance, and capacitance of the electrical path, e.g. a conductor, that directly connects two elements in the circuit 200. For example, conductor 212 linking batteries 211B and 212B may be modeled by resistor 212R, inductor 212I, and capacitor 212C.

Within the circuit 200, batteries within a given column are connected in parallel. For batteries connected in parallel, it may be desirable to ensure that the current flowing through each battery is similar to ensure that the batteries have similar performance curves. For example, when a battery is discharged, its internal resistance, voltage, current capacity, etc. may change. If one battery in a parallel circuit discharges at a different rate than another battery in the same circuit, their electrical voltages may no longer match, causing a current to flow between them and reducing the amount of current available to the circuit's output. For example, if battery 211B produced a higher voltage than battery 221B, current would flow through the circuit-loop consisting of the battery 211B, conductors 212, 2122, 222, battery 221B, and conductor 2121. In addition, batteries in parallel may not charge to their full capacity if the electrical coupling between the circuit connector and each battery do not all have the same characteristics.

During the discharging process, the depicted connecting circuitry preferably maintains an equal discharge current from each battery, and an equal voltage across each battery. Conversely, during the charging process, the connecting circuitry maintains an equal charge current to each battery and an equal voltage across each battery. Further, because the battery characteristics are kept identical or as similar as possible, the charge-acceptance rates of the batteries are maintained as equal.

Combining the parallel connection scheme provided herein with low-impedance batteries and low-impedance conductors provides ability to charge and discharge at very fast rates. For example, some preferred examples have such low series resistance values for the entire pack that it may be charged from 30% to 85% of capacity in 15 minutes. This represents well over a C1 charge rate. Many preferred examples may charge at a C1 charge rate, a 2×C1 charge rate, a 3×C1 charge rate and even a 4×C1 charge rate. Some examples of the various pack designs herein charge at a 1000 amp maximum charge rate with 500 or 600 amps being typical. This capability comes partially from the use of low impedance batteries, combined in parallel. The parallel combination divides the series impedance of each battery (or series line of batteries) by the number of parallel connections, thus drastically reducing the series impedance of the pack and increasing the maximum charge rate. Such a maximum charge rate may be employed to implement a pulse charging scheme, for example.

In the depicted circuit 200 of this example, conductors linking batteries in series within adjacent columns have identical or, as closely as possible, similar electrical characteristics. In some examples, all the conductors linking two columns of batteries may have a nearly identical resistance. For example, the resistances 212R, 222R, . . . 2N2R of all the conductors linking the first two battery columns may be the same within 1%. For some applications, a 5% tolerance is considered acceptable, but for other applications (typically larger arrays) a 1% or 0.1% tolerance is preferred. In some examples, all the conductors linking two columns of batteries may have a nearly identical inductance. For instance, the inductances 212I, 222I, . . . 2N2I of all the conductors linking the first two battery columns may be the same within 0.1% or less. Larger arrays of batteries preferably have smaller tolerances. For example, the array depicted in FIG. 7 preferably has a 0.1% or less tolerance. In some examples, all the conductors linking two columns of batteries may have a nearly identical capacitance. For instance, the capacitance 212C, 222C, . . . 2N2C of all the conductors linking the first two battery columns may be the same within 1%.

In a circuit that has batteries both in series and parallel, there may be multiple, simultaneous paths for current to flow. To ensure that the batteries in the circuit 200 are drained or charged at a similar rate, it may be desirable to force the currents in each path to be similar by controlling the electrical characteristics of each conductor in the battery array such that they are identical within a small tolerance, e.g. 0.1% or 1%. For example, the resistance 212R, inductance 212I, and capacitance 212C of the conductor linking batteries 211B and 212B may be within 0.1% of the resistance 232R, inductance 232I, and capacitance 232C of the conductor linking batteries 231B and 232B.

Precision conductors may be made to have similar characteristics by tightly controlling manufacturing variation. A single batch of batch of material may used to create a matched set of conductors. In practice, the precision conductors may be wires, cables, solid conductors, etc. In some instances, a single spool of cable may be used to manufacture a set of matched conductors; for example, conductors 212, 222, 232, . . . 2N2C may all be manufactured as a batch from the same spool of cable, with the same equipment, by the same operator during the same shift.

Batteries on the vertical edges of the depicted array in FIG. 2, such as battery 211B or 21MB, may be linked to main output lines 310, 320. Conductors 311-31N link each battery 21MB-2NMB on the positive edge of the array to a positive bus 301. Conductors 321-32N link each battery 211B-2N1B on the negative edge of the array to a negative bus 302. The conductors 311-31N, 21MB-2NMB321-32N also have identical or, as closely as possible, similar electrical characteristics to ensure that the circuit paths between each of the batteries and busses 301, 302 are as identical as possible. The conductors 311-31N, are similarly identical to each other, and may be identical to conductors 321-32N. Similar to the example in FIG. 1B, this scheme provides for an identical or similar voltage level at the positive terminal of each battery in the top-level (highest voltage potential) column of batteries, 21MB-2NMB.

The row conductors 311-31N at the positive end of the array are each connected to positive bus 301 and thereby conductively coupled to the positive main output line 310. The row conductors 321-32N at the negative end of the array are each connected to negative bus 302 and thereby conductively coupled to negative main output 320.

FIGS. 3A and 3B are more detailed circuit diagrams of the buses 301, 302 shown in FIG. 2. The output busses 301, 302 in this example are designed to have conductive paths with similar electrical characteristics as seen from the output lines 310 and 320. For example, the row conductors 311-31N are linked to the positive main output line 310 in a manner that facilitates similar conductive paths from the terminals of to the positive bus 310. In some examples, for example, the positive row conductors 311-31N may be joined to bus 310 in a radially symmetric fashion such as being clamped to a physically disc-shaped conductor, at locations equidistant from its center, with the positive main output line 310 attached to the center. In a similar fashion, conductors 321-32N on the negative edge of the battery array may be connected via bus 302 to negative main output line 320.

The electrical characteristics of each path between the row conductors at the edge of the battery array and the main output lines 310, 320 may be modeled, as described above for the conductors linking batteries, by a resistor, an inductor, and a capacitor. As an example, the electrical characteristics in the positive bus 301 between conductor 311 and the positive main output line 310 may be modeled by a resistor 311R, an inductor 311I, and a capacitor 311C; electrical pathways between the positive line and the other conductors 312-31N may be similarly modeled. Buses which result in electrical pathways being nearly identical (e.g. within 1%), such as the configurations described above may further serve to equalize current flow through the batteries in the circuit 200.

FIGS. 4A-G show a 12 volt battery pack with parallel batteries and precision conductors according to another example. In general, the battery pack 400 has high-performance power cells 401-404, precision cables 410, and a frame with several parts. Power cells 401-404 are connected in parallel by precision cables 410. For example, the battery pack 400 can use the power cells 401-404 to provide electrical power with rated capacity of 4000 W/hr. The precision cables 410 carry power from the power cells to an external load via a power bus and attached cables. The frame holds the assembly together. This exemplar battery pack may provide high levels of current to an electric device, such as an electric fork lift.

Power cells 401-404 are connected in parallel with precision cables 410. The power cells have similar electrical characteristics, such as voltage and current output and charging curves. Precision cables 410 also have similar electrical characteristics, such as resistance, inductance; and capacitance, in order to provide a synchronized DC environment with equal voltages at each positive battery terminal as discussed herein. Precision cables 410 may be manufactured as described above to minimize the electrical differences among them. Precision cables 410 connect each power cells 401-404 to a positive bus 413 and negative power bus 417, in a parallel fashion. The power buses 413, 417 are in turn connected via a positive output cable 422 and a negative output cable 421 to a main output connector 423.

The power buses 413, 417 are designed to minimize differences in the electrical paths between the precision cables 410 and load connections 492 and 494. A similar optimization is preferably made to charger connections 491 and 493. Such optimization may be performed by, for example, designing the power buses with the charger and inverter couplings in the center of the bus. Some examples may allow the distance between the charger or inverter couplings and the various precision cables 410 to only vary by a certain tolerance, such as 1 milli-ohm, 10 milli-ohms, 50 milli-ohms, or 100 milli-ohms, for example. The depicted power busses 413 and 417 are, in this example, straight busbars with the output connection made toward the physical center of the busbar. Preferably, use of straight busbars (if no further parallel cabling is used in combination) is limited to bars less than 6" in length, in order to minimize parallel path length variation.

In some examples, the battery pack can include a battery monitor shunt to monitor current flowing through the power cells 401-404. For example, multiple shunts may be placed such that current flowing through a single power cell may be monitored. Such information that is gathered may be used, for instance, to detect asymmetries in the battery pack 400, to monitor power remaining, to aid in charging control, etc.

In some examples, the conductors in the system, e.g. the precision cables 410, may be attached to their respective elements using threaded lugs or other mechanical connectors. In some examples, other techniques for forming the connections, such as soldering, may be used.

Figure 4A:
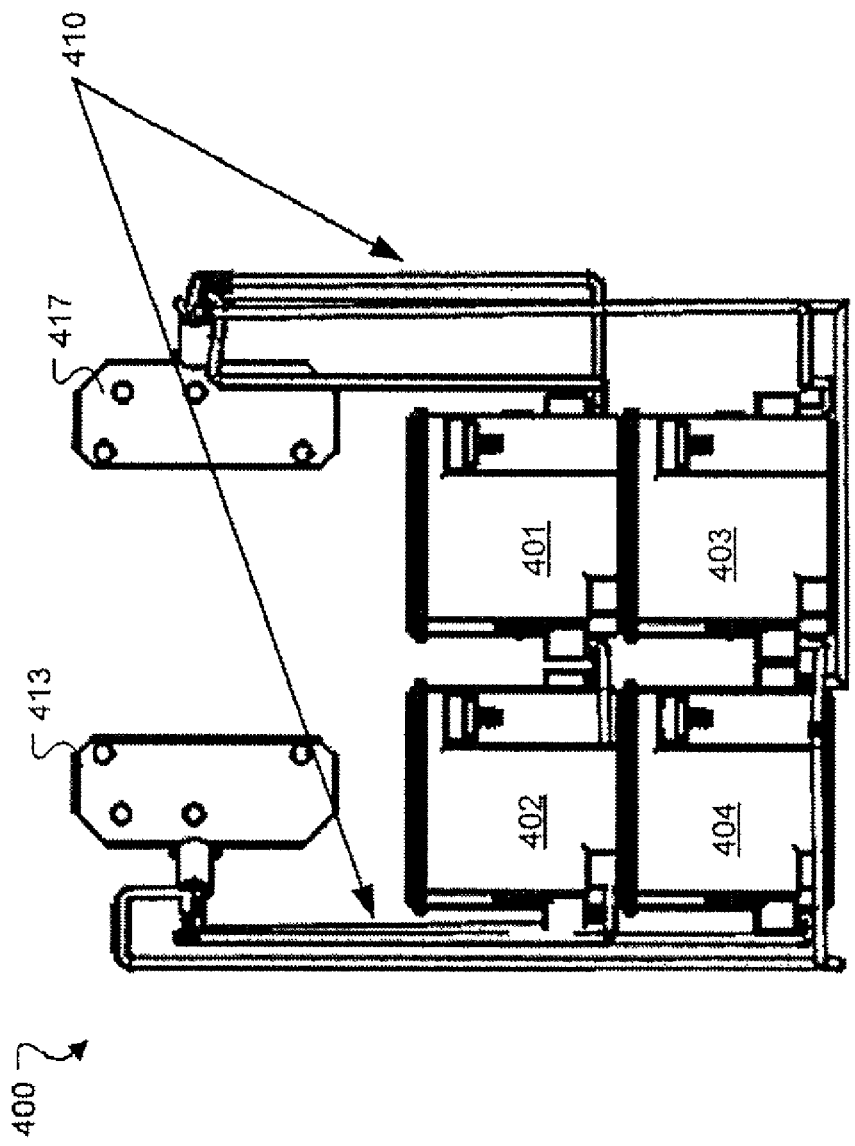
FIGS. 4A-4C illustrate the internals of the 12 volt battery pack.
Figure 4B:
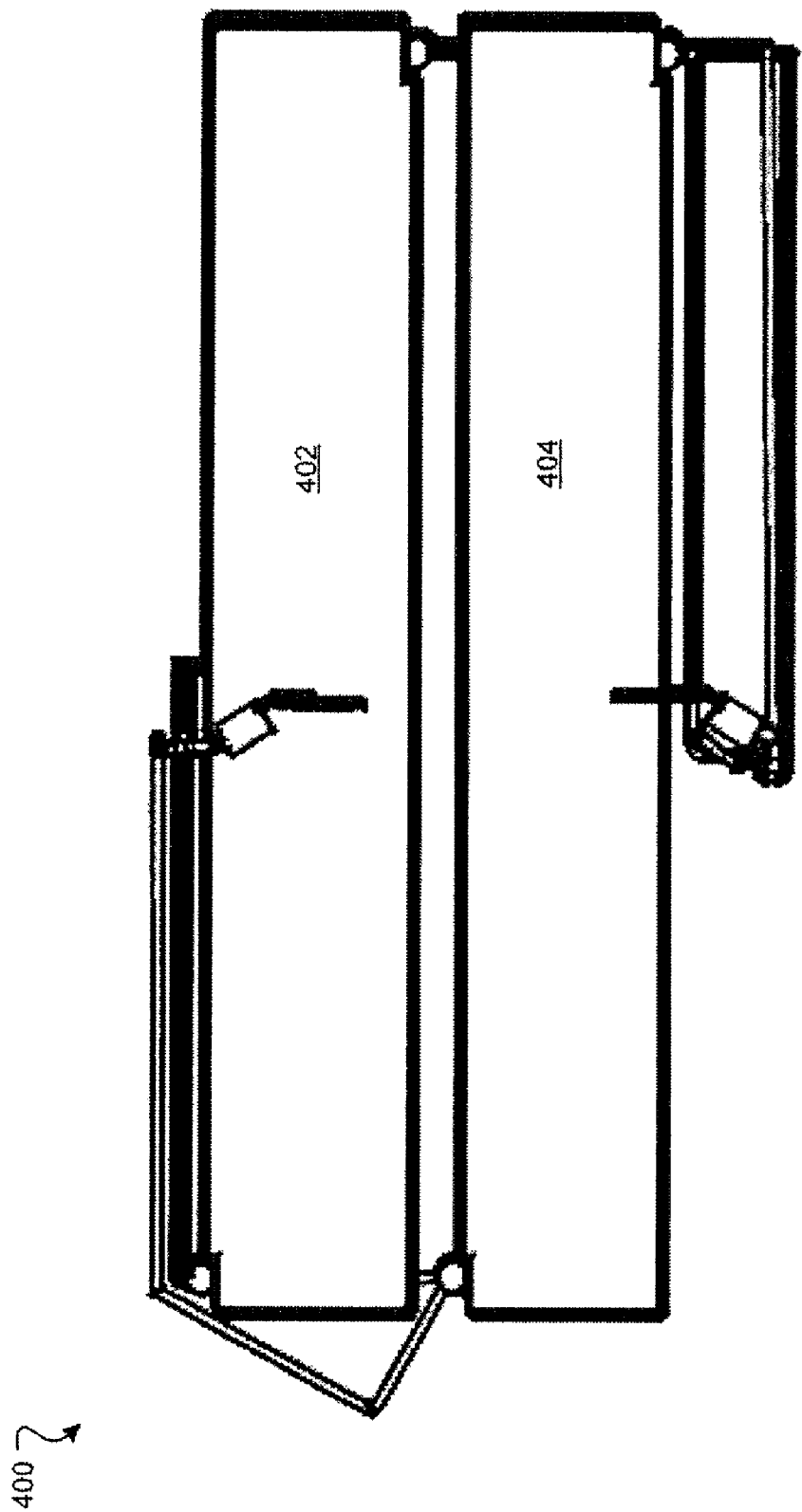
Figure 4C:
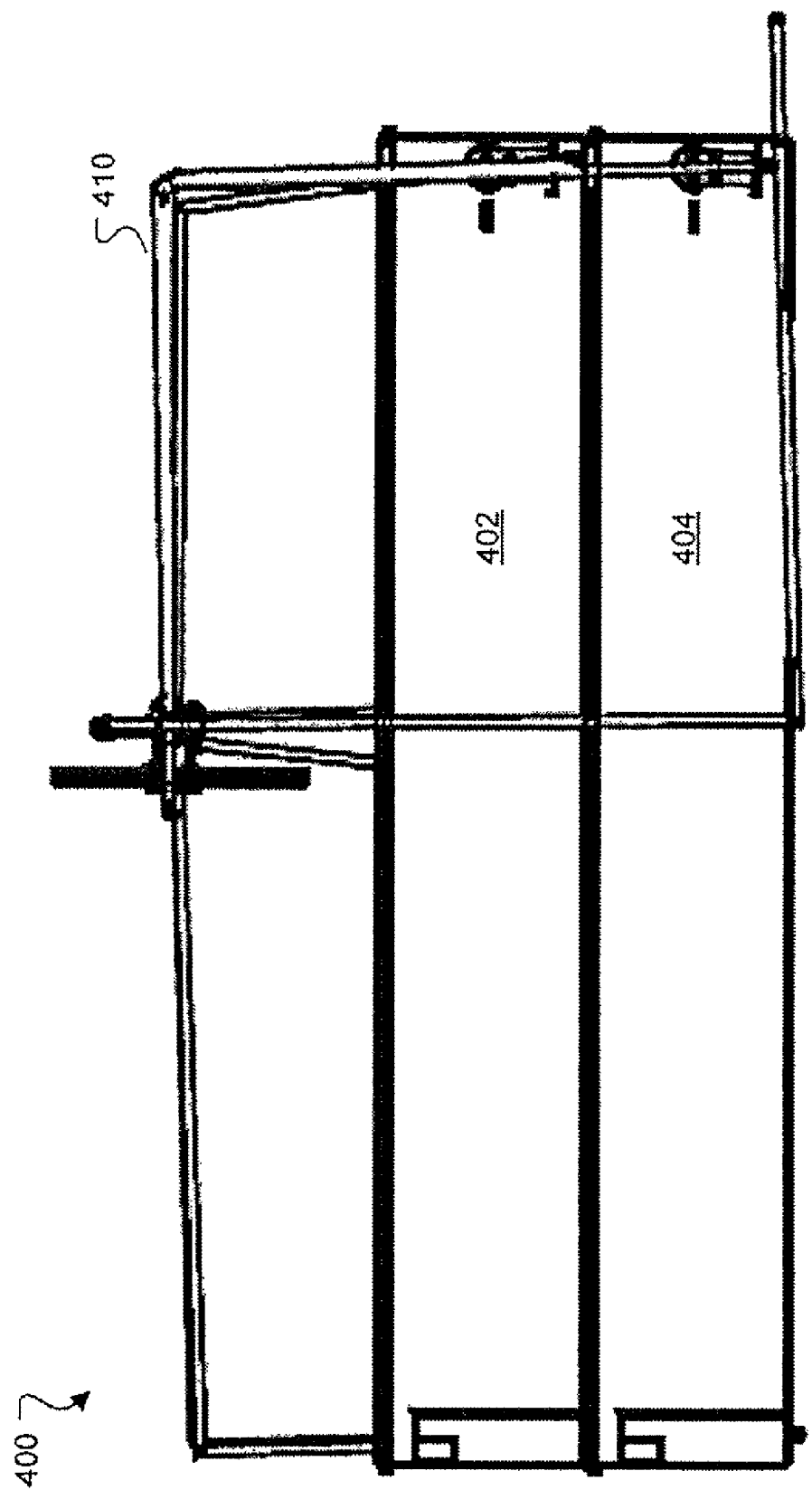
Figure 4D:
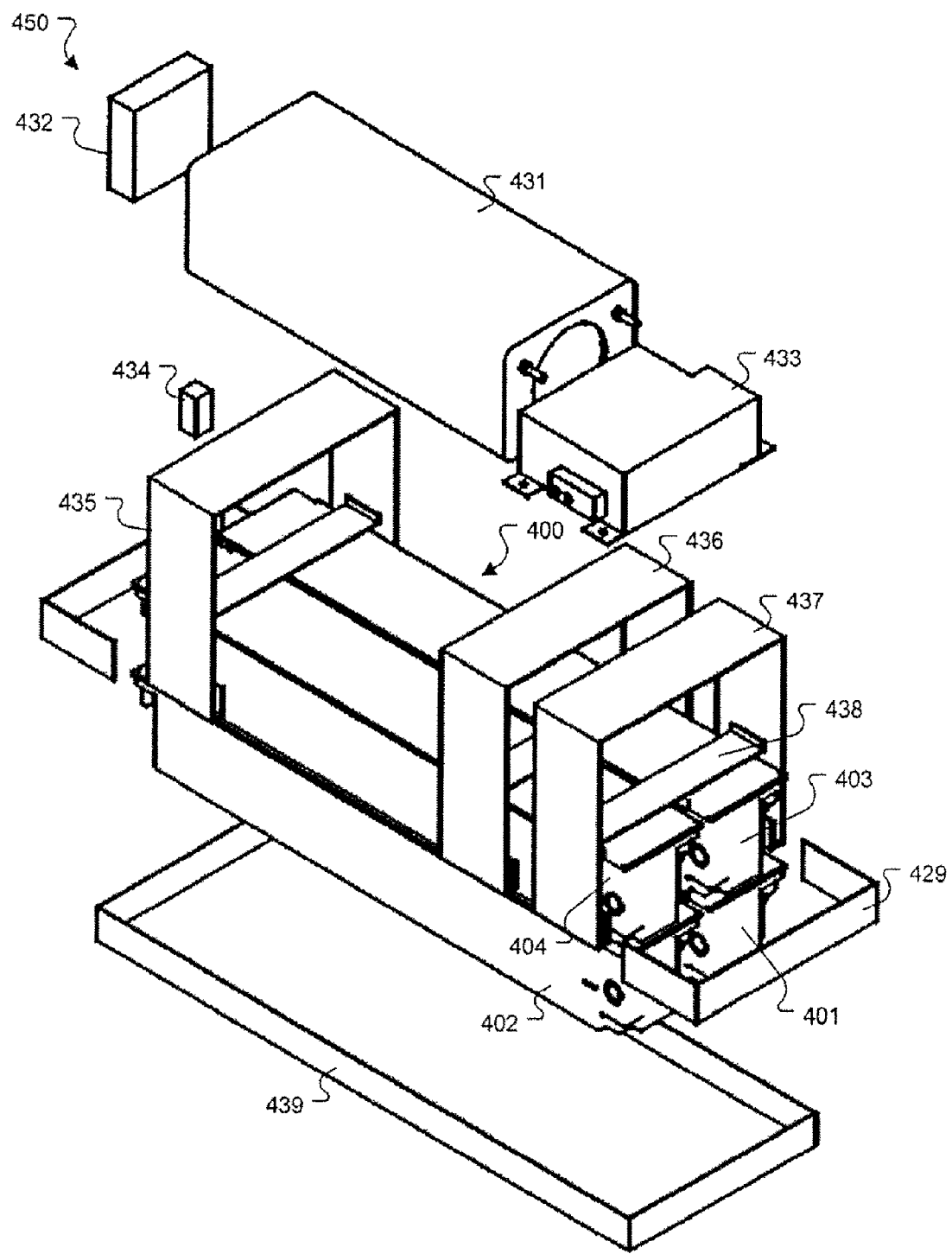
FIGS. 4D-4F are a representations of the assembled 12 volt battery pack.

FIG. 4D shows an example battery pack assembly 450 that includes the battery pack 400. The assembly 450 includes an inverter 431 to convert DC battery power in to AC output power. In one example, the inverter 431 can convert DC power of the batteries 401-404 into an AC power output of substantially 115 VAC with a frequency of substantially 60 Hz. In some examples, the AC power output can be substantially 220 VAC. In some examples, the AC power output can have a frequency of substantially 50 Hz. In one example, the inverter 431 can be a power inverter capable of outputting electrical power of 10,000 W continuously.

The fan 432 operates to reduce operating temperature of the battery pack assembly 450 and is enabled or disabled by the fan relay 434. In some examples, the battery pack assembly 450 may include an over temperature shutdown feature. For example, the battery pack assembly 450 may disable operation if an overheating is detected.

The battery pack assembly 450 includes a charger 433 to charge the batteries 401-404. For example, the charger 433 may be configured to charge the batteries 401-404 if an external power is available. In one example, the charger 433 may receive an external power of substantially 950 W having an input voltage of substantially 108-132 V. In one example, the charger 433 may receive an input voltage of substantially 200-240 V. In some examples, the charger 433 may generate an output current of, for example, 55 amp, to recharge the batteries 401-404. For example, the batteries 401-404 may be recharged at substantially the same rate without the use, in this example, of any active battery management systems or other active battery management circuitry present between batteries 404, 402 and the charger 433.

In some examples, the bus bar 410 can be positioned near the charger 433 and a DC input of the inverter 431. In some examples, the busbar 410 can be bolted or otherwise directly coupled to the inputs. In some examples, the busbar 410 can be connected thereto with a conductor shorter than the conductor connecting the batteries 401-404 to the busbar 410. In some examples, such arrangement can equalize conductor currents from the charger 433 to each of the batteries 401-404, and from each of the batteries 401-404 to the inverter 431.

In the example depicted in FIG. 4D, a battery tray 439 is located at the lower end of the power cells 401-404. The assembly 450 also includes battery brackets 435, 436, 437 at the upper end of the cells 401-404. Each of the battery brackets 435-437 includes a battery tied down 438 to hold the batteries 401-404 against the battery tray 439. In one example, the battery brackets 435-437, the battery tie downs 438 and the battery tray 439 may form a compression frame for the batteries 401-404. The compression frame may prevent the power cells 401-404 from deforming, such as may occur during charging or discharging. One possible benefit of preventing the deformation of the power cells 401-404 is to preserve the physical structure of the power cells so that electrical similarity among them is not lost.

The battery pack assembly 450 also includes a battery stabilizer 429 in the front and the back end of the battery pack 400. For example, the battery stabilizer 429 can stabilize the position of the battery pack 400 against variations due to, for example, battery swelling or vibration of the battery pack assembly 450.

Figure 4E:
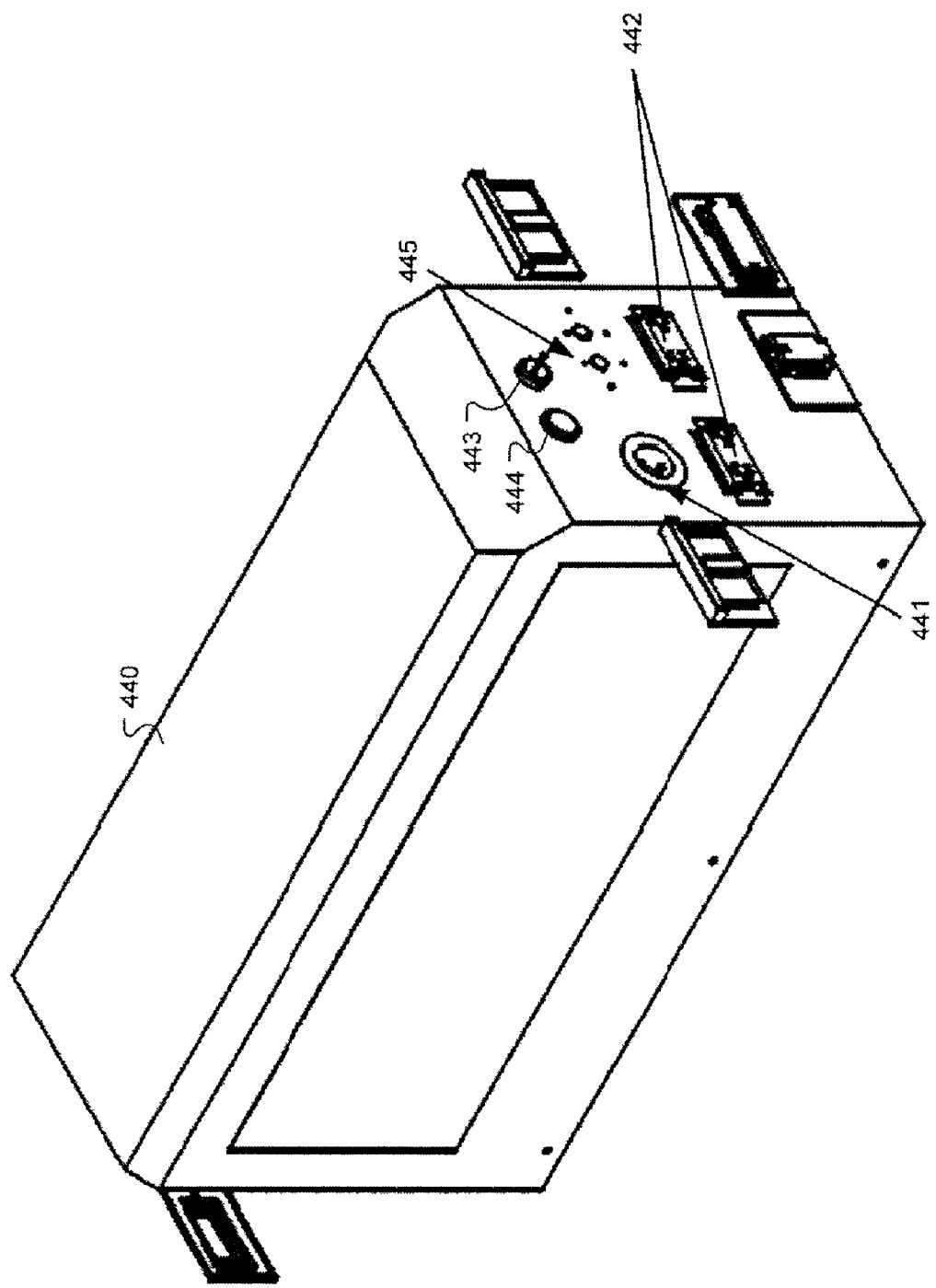

FIG. 4E shows an exterior front view of the battery pack assembly 450 example depicted above in FIG. 4D. As shown, the battery pack assembly 450 includes a housing 440. The battery pack assembly 450 is compact in size compared to similar capacity packs on the market. For example, the housing 440 may be 33.2 in. length and 11.7 in. by 19 in. cross section. At the front of the housing 440, the battery pack assembly 450 includes a charger power inlet 441, an AC power outlet 442, a power switch 443, a 12 VDC power outlet 444, and a 20 Amp breaker 445. Using the power switch 443, a user can enable or disable operations of the battery pack assembly 450.

For example, the charger 433 can receive power from the charger power inlet 441 to recharge the battery power. The AC power outlet 442 outputs AC power from the inverter 431. In some examples, the AC power outlet 442 can be a duplex 20 amp ground fault circuit interrupter (GFCI) outlet that is configured to monitor the amount of current flowing from hot to neutral at the power outlet.

Figure 4F:
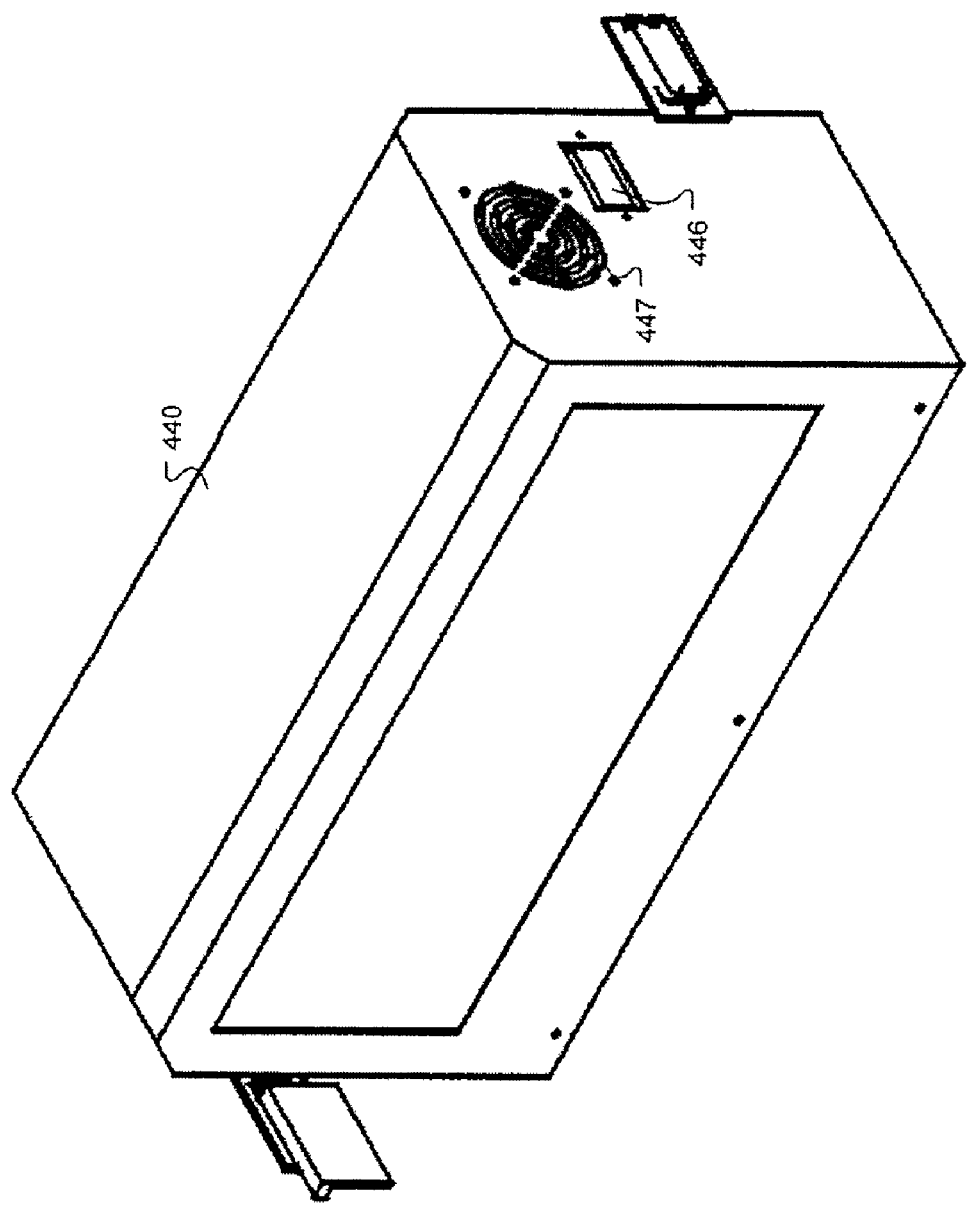

FIG. 4F shows an exterior back view of the power supply module 450 example depicted above in FIG. 4D. In the depicted example, the battery pack assembly 450 includes an Anderson connector 446 and a fan vent 447. For example, the Anderson connector 446 may be a 350 Amp Anderson connector for supporting high current load. The fan vent 447 is an air outlet of the fan 432.

In the depicted example, the battery pack assembly 450 may be easily portable. For example, the battery pack assembly 450 can weight approximately 280 lbs.

Figure 4G:
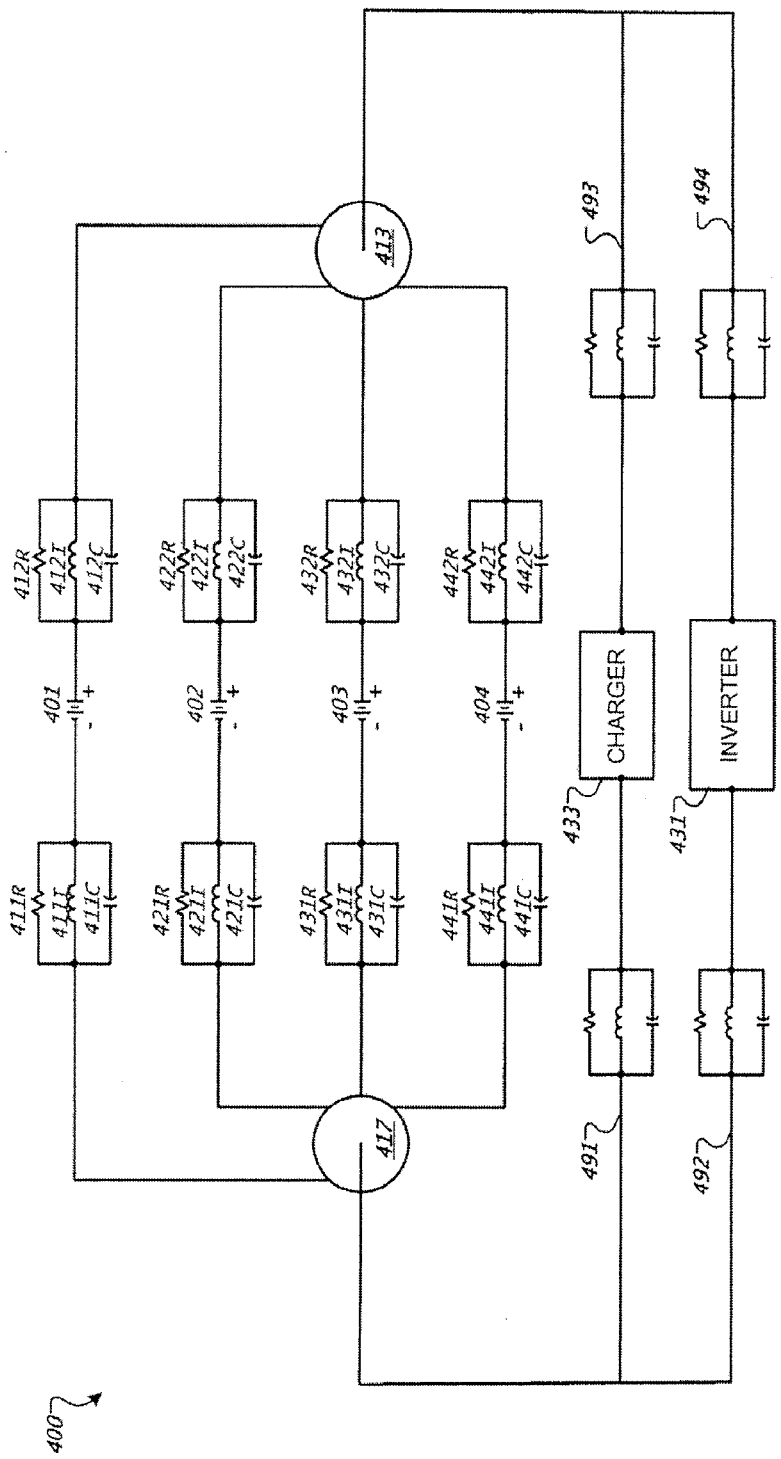
FIG. 4G is a circuit diagram of the 12 volt battery pack.

FIG. 4G is a circuit diagram of the 12V battery pack described above. The battery pack 400 implements a version of the circuit described above in FIG. 2. In this case, four 12-volt power cells are used such that no power cells are in series (i.e. N=4, M=1). Precision conductive connections 491 and 493 connect charger 433 to the parallel-connected batteries 401-404. Connections 491 and 493 are precision conductive cables, preferably shorter than the cables such as 411 and 412 connecting battery terminals to the busbars 417 and 413. The charger terminals may also be conductively coupled directly to the busbar with conductive bolts or other fittings. The inverter is similarly connected with precision connections 492 and 494, also preferably short cables or directly coupled fittings.

Figure 5:
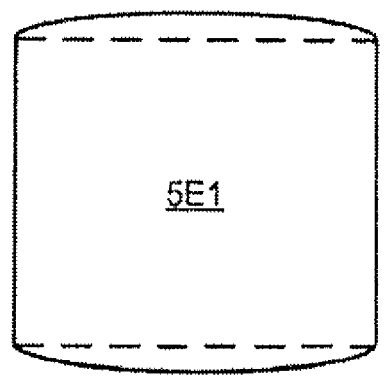
FIG. 5 illustrates an example structure for preventing a battery from swelling.
Figure 5:
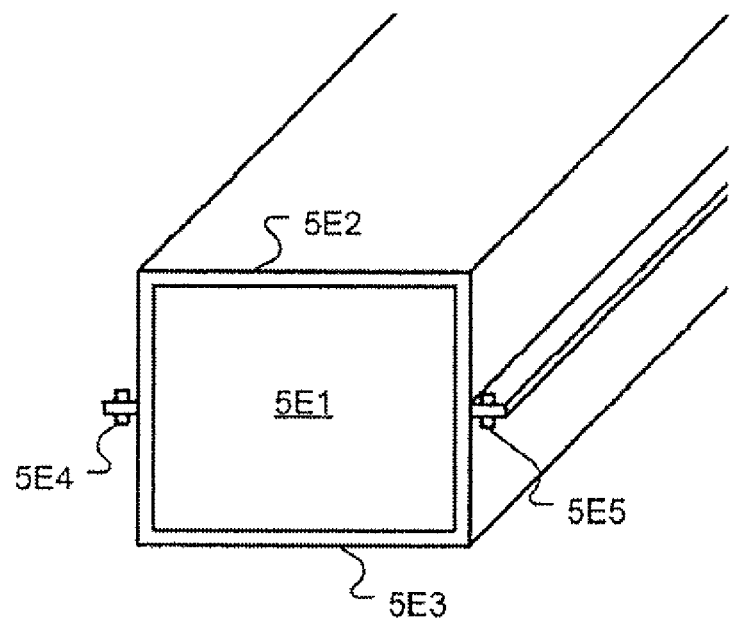

FIG. 5 shows an example of a battery cell 5E1 in a compression frame 5E2. For example, the compression frame 5E2 can be fixed against the battery cell 5E1 using the bolts 5E3, 5E4. The compression frame 5E2 can be used in the battery packs 100, 400 to prevent the batteries from swelling. If, for example, the battery cell 5E1 were to significantly swell, due for instance to gasses released during charging or discharging, the inter resistance and voltage of the battery cell 5E1 may deviate from the other battery cells in the battery pack to cause an internal current loop that depletes the stored energy and accelerates the deleterious battery divergence causing battery failure or performance degradation.

Figure 6:
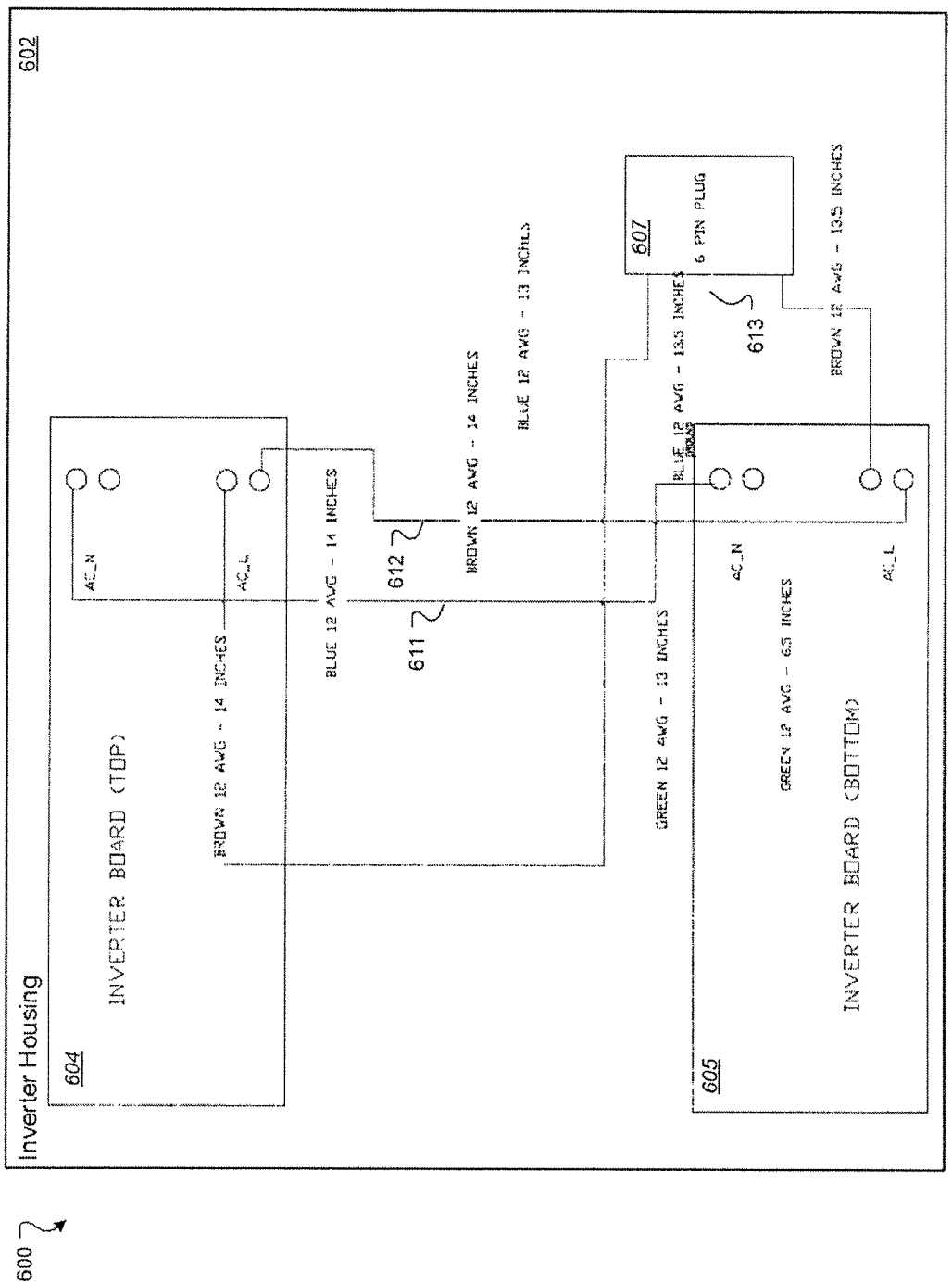
FIGS. 6-7 show a block diagram of an example inverter arrangement.

FIG. 6 shows an example power inverter module 600. The depicted module combines two commercially available inverter boards 604 and 605 into a single housing. The power inverter 600 may be employed as inverter 131 or 431 in previous figures, or other inverters herein. As shown, the power converter 600 includes an inverter housing 602. Within the inverter housing 602, the power inverter 600 includes a top inverter board 604 and a bottom inverter board 605. In a preferred example, each of the inverter boards 604, 605 is capable of generating 5000 W of AC power. For example, each of the inverter boards 604, 605 can convert DC power of the battery pack into 5000 W of continuous AC power.

The inverter 600 includes a 6-pin socket 607 providing, in this version, two 3-plug external AC sockets. Socket 607 typically includes two live output ports, two neutral output ports, and two ground output ports. In the example shown, the top and bottom inverter boards 604, 605 are connected in parallel to the socket 607 to form a single output path. As shown, both neutral pins (AC_N) of the boards 604, 605 are connected in parallel via a line 611 to both neutral output ports of the socket 607. Both live pins (AC_L) of the boards 604, 605 are connected in parallel via a line 612 to both live output ports of the socket 607. A ground line 613 connects from the board 605 to the socket 607. Preferably, the ground line 613 is connected to both of the ground ports of the socket 607, and connected to the neutral ports. Because the inverter boards 604, 605 are connected in parallel to the output socket 607, both of the boards 604, 605 may simultaneously supply power to a load substantially equally. The wiring shown is preferably accomplished by soldering directly to traces or pads directly on the inverter boards. Preferred wiring is high capacity wiring such as 12 AWG, which may be greater capacity than the wiring arrangements in typical commercially provided battery packs to allow higher peak loads. Preferably, cables are controlled lengths as listed to provide equal impedance paths from both inverter boards. Such modifications to commercial inverters bypasses current limiting devices in the output path and allows modified current capacity, using instead current limiting devices such as fuses, breakers, and GFI circuits included in the battery pack circuit.

Figure 7:
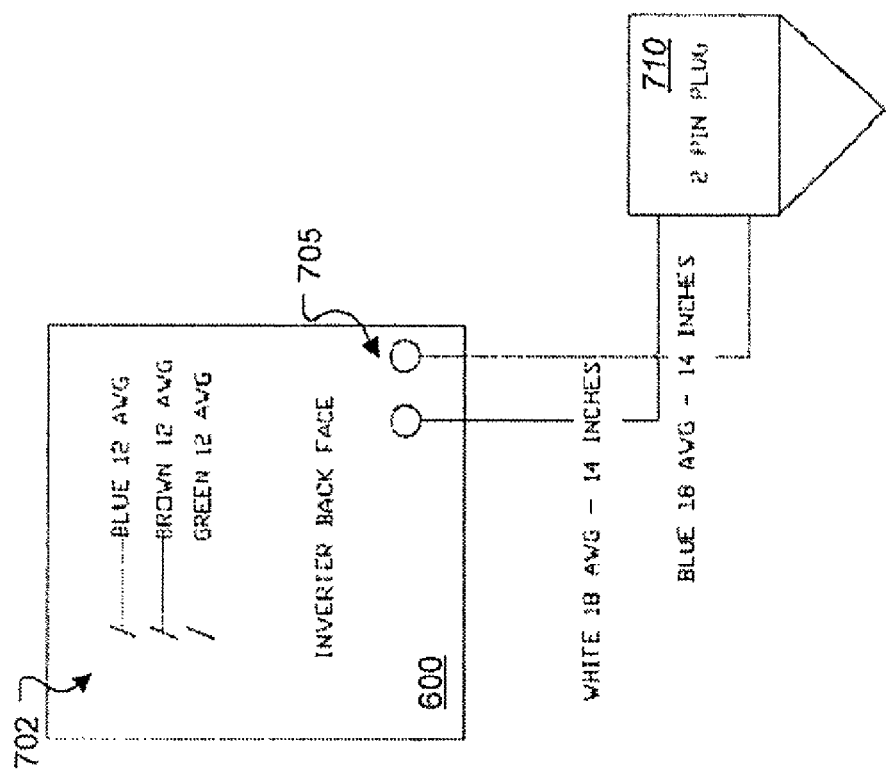

FIG. 7 shows a back face of the inverter 600. The inverter 600 includes a power switch 705 on the back face. As shown a 2-pin socket 710 is connected to the inverter 600 via the switch 705. In some examples, socket 710 can be connected to a system power control to enable or disable operations of inverter 600.

Figure 8A:
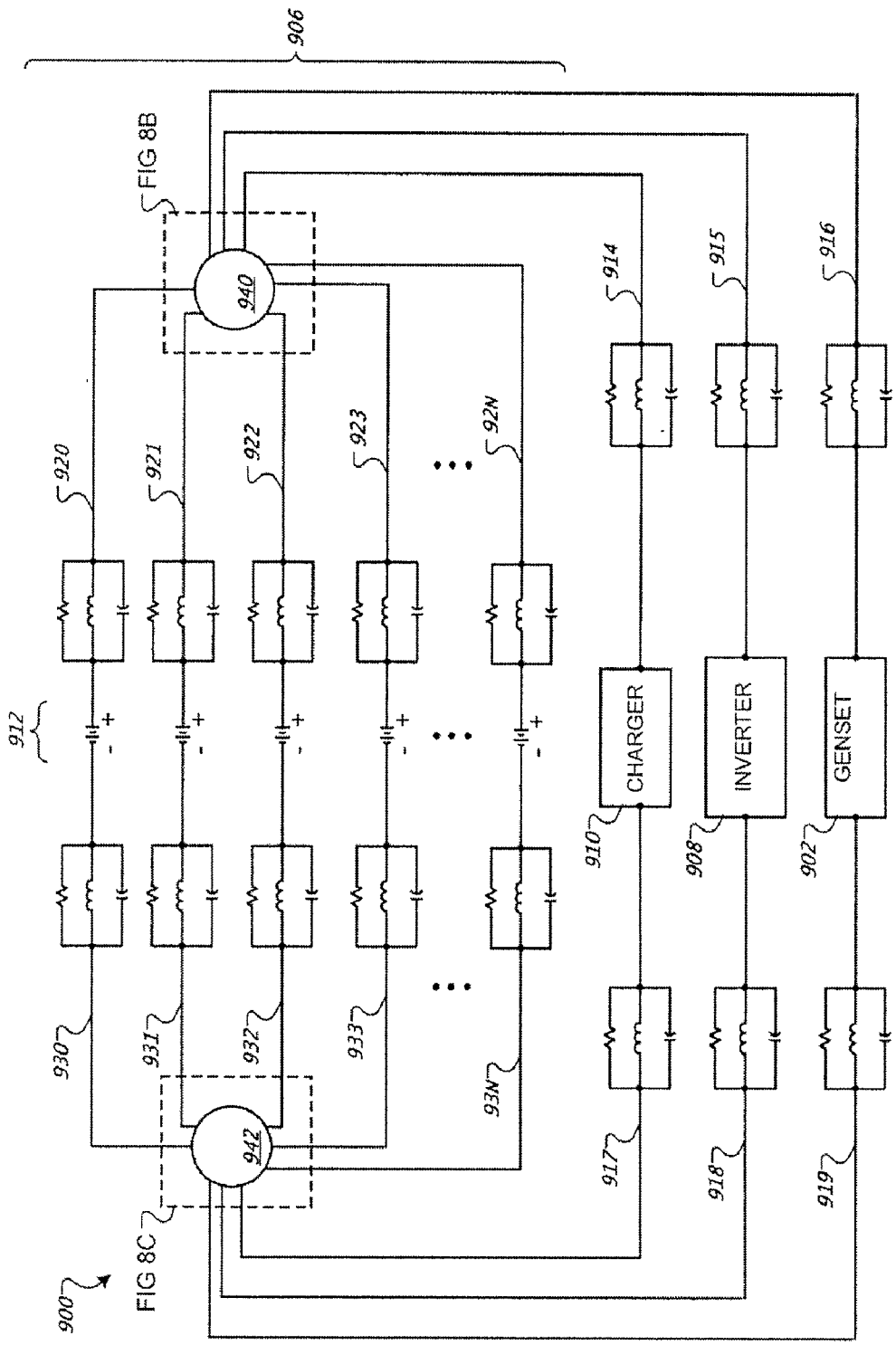
FIGS. 8A-C illustrate a circuit diagram of a system for providing electric power.
Figure 8C:
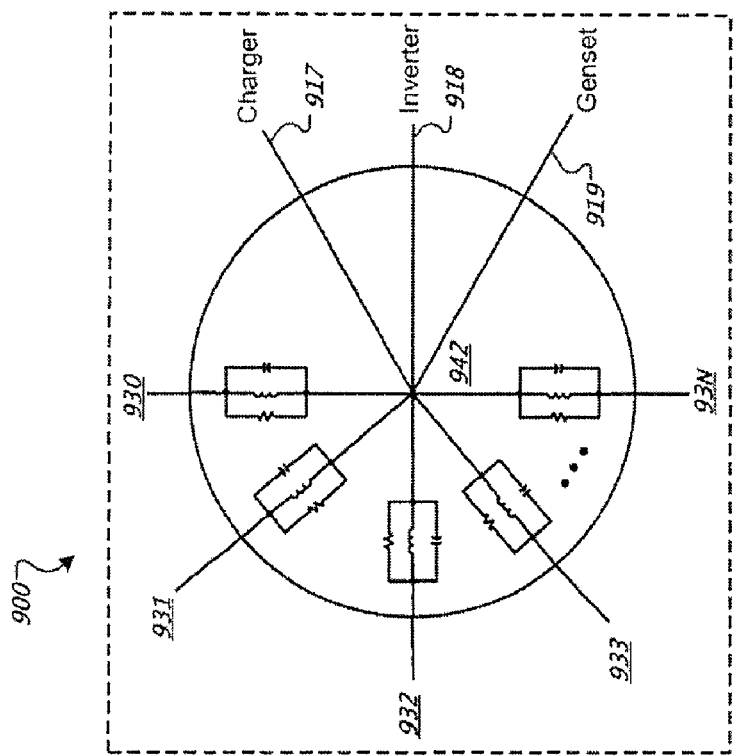
Figure 8B:
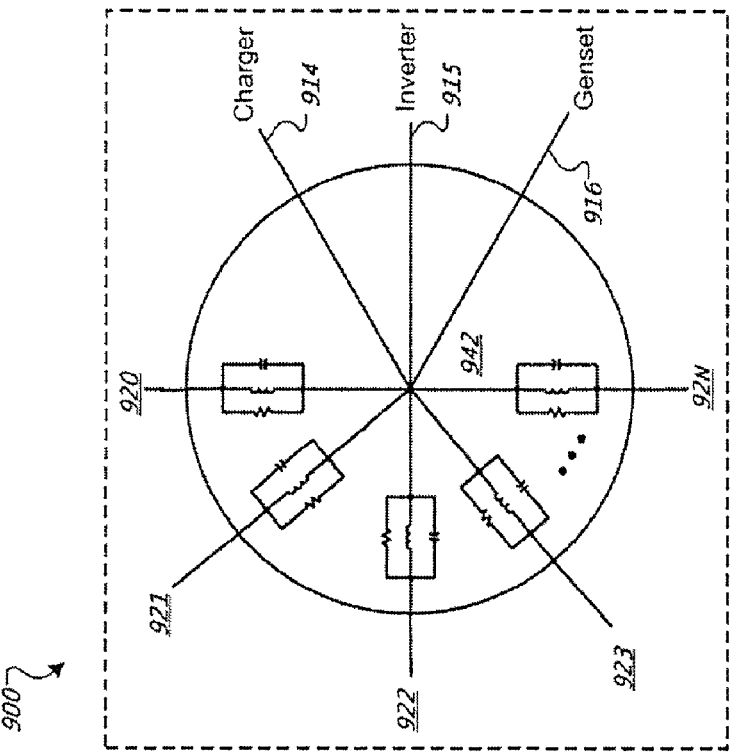

FIGS. 8A-C illustrate a circuit diagram of a system for providing electric power. In general, the system 900 has a genset 902, a battery pack 906, an inverter 908, and a charger 910. A genset refers to an electrical power generator coupled with a power plant such as a gas-powered engine. In this example genset 902 generates DC power for providing a portable DC power source to charge battery pack 906. In some examples, genset 902 also provides AC power (not shown) directly at an output on genset 902. The depicted combination may be useful for situations when a generator has either a much larger capacity than the intended load(s), and therefore fuel is wasted to continuously run the generator, or has too small a capacity for intended loads. In the latter scenario, genset 902 may be run for many hours to charge battery pack 906, which then supplies power to loads at a higher rate than the genset. The battery pack 906 may supply or store power. The inverter 908 may convert DC power provided by the genset 902 or battery pack 906 to AC power for powering external devices. The charger 910 may be used to charge the battery pack 906 from an external power source. As a result, the system 900 may provide AC power to external devices directly from the genset 902 or power stored in the battery pack 906 produced by an external source or the genset 902 during off-peak conditions.

The battery pack 906 may have a similar structure to that described above in FIGS. 2-3B. Power cells 912 are of a similar type with uniform electrical characteristics. The power cells 912 may be connected in parallel by precision conductors 920-92N to a positive terminal 940 and by precision conductors 930-93N to a negative terminal 942. The precision conductors 920-92N have uniform electrical characteristics, such as resistance, inductance, and capacitance and are modeled by the corresponding circuit elements in FIG. 8A (e.g. resistor 945, inductor 947, and capacitor 949 model precision conductor 920). Precision conductors 930-93N are similarly uniform, and are preferably uniform to conductors 920-92N.

The genset 902, inverter 908, and charger 910 are all connected in parallel with the battery pack 906 by conductors 914-919. In some examples, one or more of conductors 914-919 may also have uniform properties to allow parallel simultaneous operation of their connected devices without deleterious cross-currents. Power produced by the genset 902 may be used to charge a battery pack 906 or be converted by the inverter 908 to AC power for use by other devices (not shown). In some instances, the genset 902 may run continuously, charging the battery pack 906 during times of less-than-maximum use; the battery pack 906 may then supplement the genset during time periods when power use exceeds that available from the genset 902. In some instances, the battery pack 906 may provide backup power to the inverter 908 in case the genset is unavailable due to other constraints such as maintenance, lack of fuel, environmental regulations, etc.

The charger 910 may be used to charge battery pack 902 from external electricity source. In some instances, it may be desirable or necessary to use an external electricity source such as cases where fuel for the genset 902 may be more expensive that equivalent electricity from the grid.

As with a discharge cycle, it is desirable to uniformly distribute current flowing into connected power cells during a charging cycle. Use of the above system with power cells and precision conductors that have similar electrical characteristics evens out current flowing into the power cells so that they have a similar charge and losses within the battery pack 906 due to internal currents are minimized.

The positive terminal 940 is shown in more detail in FIG. 8B and the negative terminal is shown in more detail in FIG. 8C. The figures show a circuit diagram that models characteristics of the electrical pathways 950-95N within the terminals between the precision conductors 920-92N, 930-93N. As with the precision conductors, the electrical characteristics of the pathways 950-95N preferably are uniform within a specified tolerance (e.g. 1%) to ensure that current flowing to or from each power cell is uniform (see above).

Figure 9A:
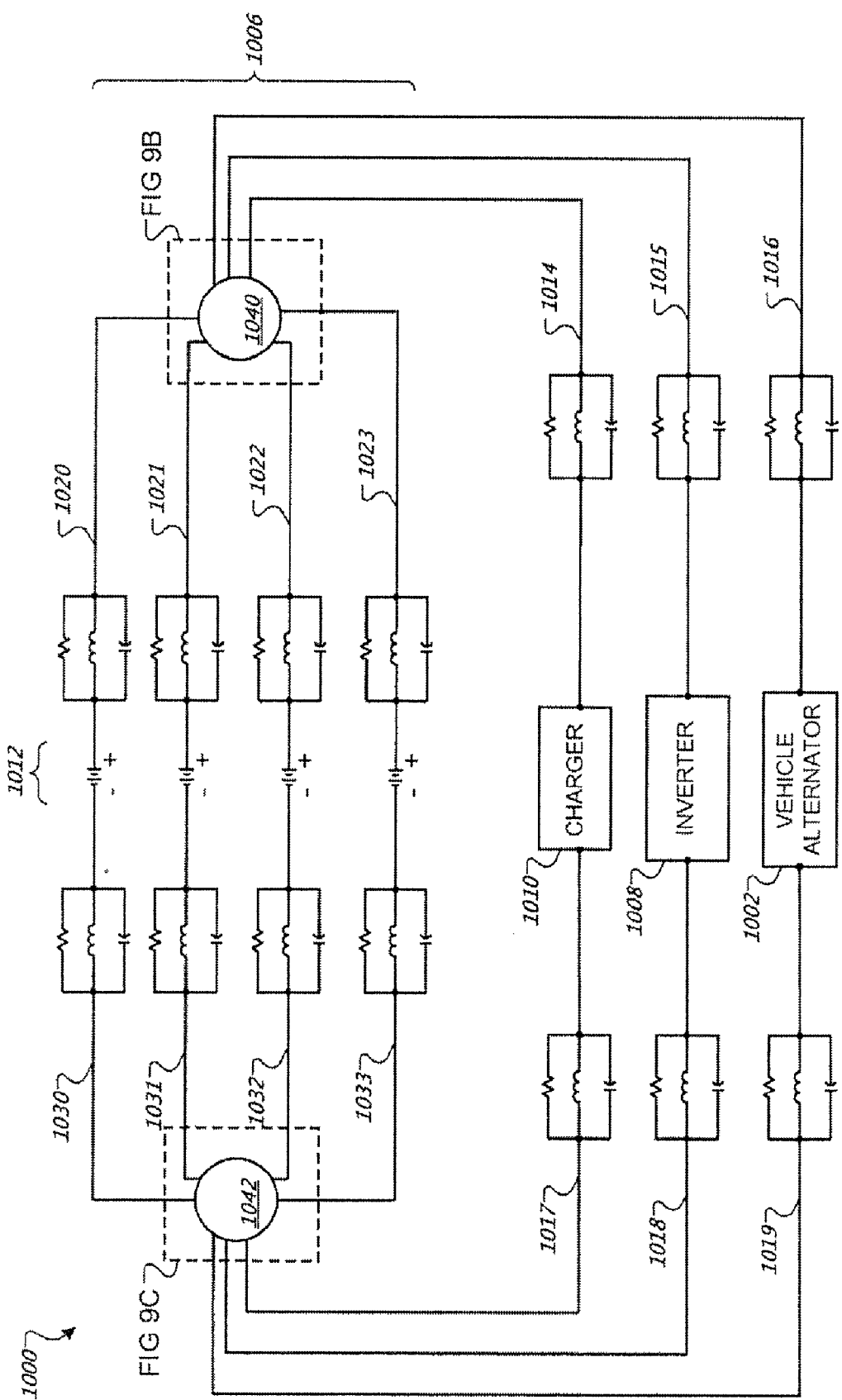
FIGS. 9A-C illustrate a circuit diagram of a system having a battery pack coupled to a automobile electrical system.
Figure 9C:
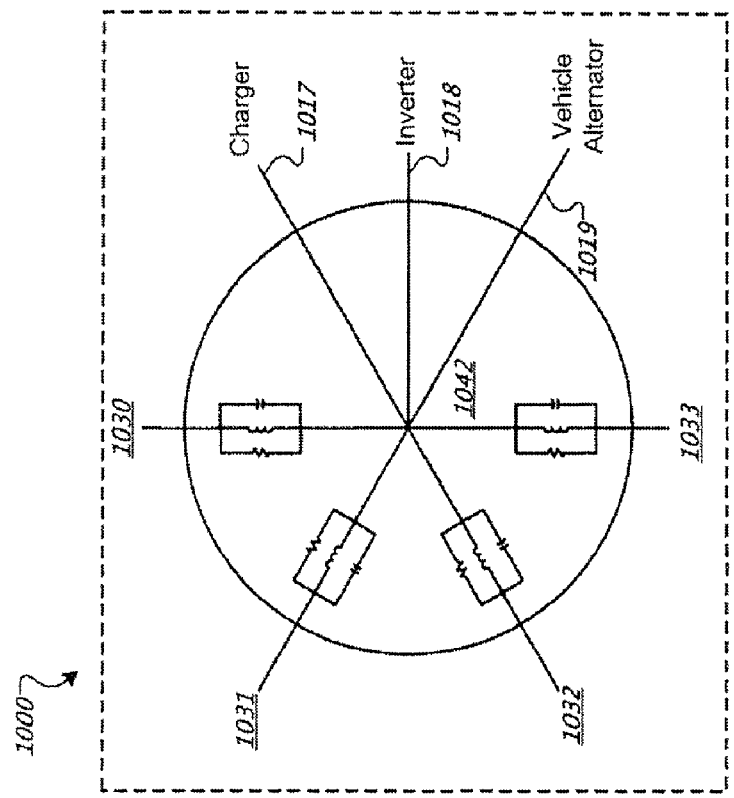
Figure 9B:
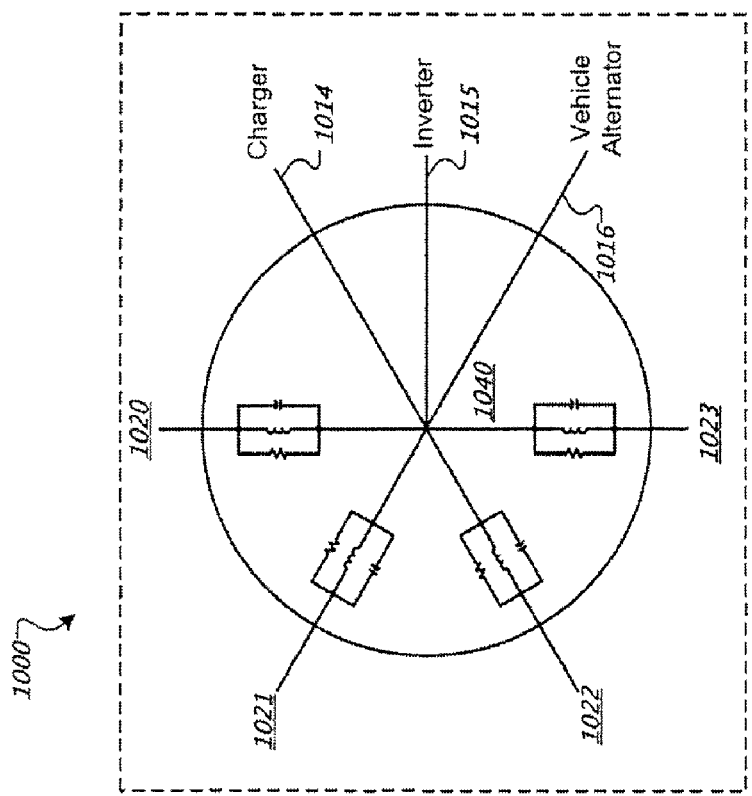

FIGS. 9A-C illustrate a circuit diagram of a system having a battery pack coupled to an automobile electrical system. In general, the system 1000 resembles the system 900 described above in FIGS. 8A-C, but makes use of a vehicle's engine and alternator in place of a genset. Such a system 1000 may be incorporated into a vehicle, for example, such as in a contractor's truck at a construction site or a mobile home at a campground.

In general, the system 1000 has an alternator 1002, a battery pack 1006, an inverter 1008, and a charger 1010. The alternator 1002 may generate DC power when an attached engine is running. The battery pack 1006 may supply or store power. The inverter 1008 may convert DC power provided by the alternator 1002 or batter pack 1006 to AC power for powering external devices. The charger 1010 may be used to charge the battery pack 1006 from an external power source. As a result, the system 1000 may provide AC power to external devices directly from the alternator 1002 or power stored in the battery pack 1006 produced by an external source or the alternator 1002 during off-peak conditions.

The battery pack 1006 may have a similar structure to that described above in FIGS. 2-3B. Power cells 1012 are of a similar type with uniform electrical characteristics. The power cells 1012 may be connected in parallel by precision conductors 1020-1023 to a positive terminal 1040 and by precision conductors 1030-1033 to a negative terminal 1042. The precision conductors 1020-1023, 1030-1033 have uniform electrical characteristics, such as resistance, inductance, and capacitance and are modeled by the corresponding circuit elements in FIG. 8A (e.g. resistor 1045, inductor 1047, and capacitor 1049 model precision conductor 1020).

The alternator 1002, inverter 1008, and charger 1010 are all connected in parallel with the battery pack 1006 by conductors 1014-1016 and 1017-1019. These conductors may, in some examples, be uniform precision conductors having almost identical impedances to facilitate parallel operation. Power produced by the alternator 1002 may be used to charge a battery pack 1006 or be converted by the inverter 1008 to AC power for use by other devices (not shown). In some instances, the alternator 1002 may run continuously, charging the battery pack 1006 during times of less-than-maximum use; the battery pack 1006 may then supplement the genset during time periods when power use exceeds that available from the alternator 1002. In some instances, the battery pack 1006 may provide backup power to the inverter 1008 in case the genset is unavailable due to other constraints such as maintenance, lack of fuel, environmental regulations, etc. The charger 1010 may be used to charge battery pack 1002 from external electricity source. In some instances, it may be desirable or necessary to use an external electricity source such as cases where fuel for the alternator 1002 may be more expensive that equivalent electricity from the grid.

Although a number of examples of the battery pack assembly are described, other examples may also be used. In some preferred examples, the battery packs and circuits discussed in detail in U.S. patent application Ser. No. 11/549,006, filed on Oct. 12, 2006, entitled "POWER SUPPLY MODULES HAVING A UNIFORM DC ENVIRONMENT" by Aeron Hurst, et al., and those discussed in U.S. patent application Ser. No. 11/549,013, filed on Oct. 12, 2006, entitled "PRECISION BATTERY PACK CIRCUITS" by Aeron Hurst, et al., which are hereby incorporated by reference in their entirety, can also be used to construct power modules with uniform DC environment.

A number of examples of the invention have been described. Nevertheless, it will be understood that various modifications may be made, and variations on the disclosed examples may be provided, without departing from the spirit and scope of the invention. For example, different battery chemistries and construction materials may be used. As another example, different circuitry may be used to practice the methods described herein. Accordingly, the following claims define the scope of the invention.

What is claimed is:

1. A power supply module comprising:
a housing;
a battery pack inside the housing, the battery pack comprising multiple battery units and a conductive assembly connecting the multiple battery units in parallel, the conductive assembly being adapted to passively prevent voltage divergence of the multiple battery units, wherein the conductive assembly comprises multiple conductive paths, each extending from a positive terminal of the battery pack to a positive terminal of a respective battery unit and each having a matched under-load resistance;
an inverter in the housing, operatively coupled to the conductive assembly and presenting an AC voltage output connection terminal of the power supply module; and
a charger in the housing, operatively coupled to the conductive assembly and operable to charge the multiple battery units from a power input.

2. The power supply module of claim 1 wherein the module is capable of outputting at least 5,000 Watts of continuous power and has a weight of less than 215 pounds.

3. The power supply module of claim 1 wherein the module is capable of outputting at least 10,000 Watts of continuous power and has a weight of less than 325 pounds.

4. The power supply module of claim 1 wherein the module has a capacity of at least 2000 Watt-hours.

5. The power supply module of claim 1 wherein the module has a capacity of at least 4000 Watt-hours.

6. The power supply module of claim 1 in the form of a self-supporting moveable power pack.

7. The power supply module of claim 1 wherein the multiple battery units comprise sealed lead acid batteries and the module has a capacity of at least 2000 Watt-hours and a weight of less than about 215 pounds.

8. The power supply module of claim 1 wherein the conductive assembly comprises high power DC cables.

9. The power supply module of claim 1 wherein the conductive assembly comprises at least one busbar.

10. The power supply module of claim 1 wherein the conductive assembly includes a positive busbar and a negative busbar.

11. The power supply module of claim 10 wherein the positive and negative busbars are conductively coupled to a positive and negative input terminal of the inverter, respectively, through conductors having a length shorter than lengths of conductors comprising the conductive assembly connecting the respective positive and negative battery terminals to the positive and negative busbars.

12. The power supply module of claim 10 wherein the charger has positive and negative output terminals electrically connected to the positive and negative busbars, respectively.

13. A portable power pack comprising:
a housing;
multiple battery units in the housing, each having an anode and a cathode;
a positive bus and a negative bus and a conductive assembly connecting the multiple battery units in parallel between the positive bus and the negative bus, the conductive assembly adapted to passively prevent voltage divergence of the multiple battery units and comprising multiple high-capacity cables having precision matched lengths, each connecting to a respective battery unit and each having an under-load resistance matched to an under-load resistance of each of the other high-capacity cables;
an inverter in the housing, having a positive DC input terminal connected to the positive bus and a negative DC input terminal connected to the negative bus; and
a charger in the housing, operatively coupled to the conductive assembly and operable to charge the multiple battery units from a power input;
wherein the conductive assembly and positive bus comprise multiple conductive paths having matched DC electrical lengths from the battery cathodes to the inverter positive DC input terminal.

14. The power pack of claim 13 in which the conductive assembly and positive bus comprise multiple conductive paths having matched DC electrical lengths from the battery cathodes to a charger positive output terminal.

15. The power pack of claim 13 wherein the power pack has a capacity of at least 2000 Watt-hours.

16. The power pack of claim 13 wherein the power pack has a capacity of at least 4000 Watt-hours.

17. A method of assembling a power pack enclosed in a housing, the method comprising:

connecting multiple battery units in parallel with a conductive assembly to form a battery pack having a positive terminal and a negative terminal, the conductive assembly adapted to passively prevent voltage divergence of the multiple battery units, wherein the conductive assembly comprises multiple conductive paths, each extending from the positive terminal of the battery pack to a terminal of a respective battery unit and each having a matched under-load resistance;

connecting an inverter in the housing to the conductive assembly, the inverter presenting an AC voltage at an output connection terminal of the power pack; and connecting a charger in the housing to the conductive assembly, the charger operable to charge the multiple battery units from a power input.

18. The method of claim 17 further comprising:

selecting the multiple conductive paths, wherein the selected multiple conductive paths have matching electrical lengths.

19. A method of supplying electrical power from a battery pack enclosed in a housing, the battery pack comprising multiple batteries connected in parallel, the method comprising:

discharging the multiple batteries simultaneously, the multiple batteries connected by a conductive assembly adapted to passively prevent voltage divergence of the multiple batteries, wherein the conductive assembly comprises multiple conductive paths, each extending from a positive terminal of the battery pack to a positive terminal of a respective battery and each having a matched under-load resistance;

converting power produced from discharging the multiple batteries to AC power; and supplying the AC power to an AC output connector for power transfer from the power pack to an external load.

* * * * *